(12) United States Patent
Kan et al.

(10) Patent No.: US 12,437,225 B2
(45) Date of Patent: Oct. 7, 2025

(54) LINEAR-OPTICAL ENCODED GHZ MEASUREMENTS AND FAULT-TOLERANT QUANTUM COMPUTATION AND COMMUNICATION

(71) Applicant: ORCA Computing Limited, London (GB)

(72) Inventors: Angus Kan, London (GB); Brendan Pankovich, Sandwich, MA (US)

(73) Assignee: ORCA Computing Limited, London (GB)

( * ) Notice: Subject to any disclaimer, the term of this patent is extended or adjusted under 35 U.S.C. 154(b) by 22 days.

(21) Appl. No.: 18/487,585

(22) Filed: Oct. 16, 2023

(65) Prior Publication Data
US 2024/0256939 A1    Aug. 1, 2024

(30) Foreign Application Priority Data

Jan. 24, 2023  (GB) ...................................... 2300991
Jun. 2, 2023  (GB) ...................................... 2308274

(51) Int. Cl.
*G06N 10/70*    (2022.01)
(52) U.S. Cl.
CPC .................................... *G06N 10/70* (2022.01)
(58) Field of Classification Search
CPC ............................... G06N 10/70; G06N 10/40
See application file for complete search history.

(56) References Cited

U.S. PATENT DOCUMENTS

| | | | |
|---|---|---|---|
| 11,126,062 B1* | 9/2021 | Kieling | G02F 1/365 |
| 11,940,834 B1* | 3/2024 | Nickerson | G06N 10/00 |
| 2021/0304053 A1* | 9/2021 | Pant | G06N 10/40 |
| 2022/0172096 A1* | 6/2022 | Rudolph | B82Y 20/00 |
| 2024/0303521 A1* | 9/2024 | Gimeno-Segovia | G06N 10/40 |
| 2024/0393659 A1* | 11/2024 | Cable | G02F 1/311 |

FOREIGN PATENT DOCUMENTS

WO    WO-2022159902 A1 *    7/2022    ............. G06N 10/20

OTHER PUBLICATIONS

M. Jiang and D. Dong, "An efficient scheme for multi-party quantum state sharing via GHZ channels," Proceedings of the 10th World Congress on Intelligent Control and Automation, Beijing, China, 2012, pp. 5122-5126. (Year: 2012).*
Schmidt et al., "Efficiencies of logical Bell measurements on CSS codes with static linear optics", arxiv.org, Cornell University Library, 201 Olin Library Cornell University Ithaca, NY 14853, Dec. 21, 2018 (Dec. 21, 2018), XP081358753, DOI: 10.1103/PHYSREVA. 99.062308, pp. 1-21. (Year: 2018).*

(Continued)

*Primary Examiner* — Albert Decady
*Assistant Examiner* — Enamul M Kabir
(74) *Attorney, Agent, or Firm* — Fenwick & West LLP

(57) ABSTRACT

Methods and systems are provided for performing an encoded n-qubit GHZ measurement on n encoded (logical) qubits using encoded Bell state measurements (E-BSMs). Each E-BSM comprises a plurality of dual-rail Bell state measurements (DR-BSMs) performed on pairs of dual-rail encoded photonic qubits (DR-qubits). Methods and systems for using encoded n-qubit GHZ measurements for fault-tolerant measurement-based quantum computation are also provided.

26 Claims, 20 Drawing Sheets

(56) References Cited

OTHER PUBLICATIONS

Omkar et al., "All-photonic architecture for scalable quantum computing with Greenberger-Horne-Zeilinger states", Aug. 1, 2022, pp. 1-21 (Year: 2022).*
Li, Z.D. et al. "Experimental quantum repeater without quantum memory," *Nature photonics*, vol. 13, No. 9, Sep. 2019, 5 pages.
Omkar, S. et al. "All-photonic architectural roadmap for scalable quantum computing using Greenberger-Horne-Zeilinger states," arXiv:2109.12280, Aug. 1, 2022, 21 pages.
PCT International Search Report and Written Opinion, PCT Application No. PCT/GB2023/053282, Jan. 29, 2024, 14 pages.
Schmidt, F. et al. "Efficiencies of logical Bell measurements on CSS codes with static linear optics," arXiv preprint arXiv:1812.09278, Dec. 21, 2018, 21 pages.

\* cited by examiner

| Measurement Pattern | Inferred Dual-Rail Encoded State | $zz$ | $xx$ |
|---|---|---|---|
| (1,1,0,0) (0,0,1,1) | $|\psi_{0,0}\rangle_{DR}$ | +1 | +1 |
| (0,1,0,1) (1,0,1,0) | $|\psi_{0,1}\rangle_{DR}$ | +1 | -1 |
| (2,0,0,0) (0,0,0,2) | $|01\rangle_{DR} = |1_1 0_2 0_3 1_4\rangle$ | -1 | Fail |
| (0,2,0,0) (0,0,2,0) | $|10\rangle_{DR} = |0_1 1_2 1_3 0_4\rangle$ | -1 | Fail |

FIG. 2E

|  | 0 | 0.001 | 0.01 | 0.02 | 0.03 | 0.04 | 0.05 | 0.08 | 0.1 |
|---|---|---|---|---|---|---|---|---|---|
| (4,1) | 0.8240 | 0.8044 | | | | | | | |
| (4,2) | 0.8240 | 0.8213 | 0.7932 | 0.7546 | | | | | |
| (4,3) | 0.8240 | 0.8200 | 0.7825 | 0.7375 | | | | | |
| (4,4) | 0.8240 | 0.8187 | 0.7681 | 0.7073 | | | | | |
| (5,1) | 0.9091 | 0.8823 | | | | | | | |
| (5,2) | 0.9091 | 0.9073 | 0.8854 | 0.8504 | 0.8058 | 0.7533 | | | |
| (5,3) | 0.9091 | 0.9065 | 0.8804 | 0.8468 | 0.8081 | 0.7646 | 0.7167 | | |
| (5,4) | 0.9091 | 0.9056 | 0.8701 | 0.8236 | 0.7705 | 0.7122 | | | |
| (6,1) | 0.9539 | 0.9201 | | | | | | | |
| (6,2) | 0.9539 | 0.9527 | 0.9355 | 0.9031 | 0.8583 | 0.8035 | 0.7411 | | |
| (6,3) | 0.9539 | 0.9522 | 0.9354 | 0.9120 | 0.8830 | 0.8480 | 0.8070 | | |
| (6,4) | 0.9539 | 0.9516 | 0.9285 | 0.8958 | 0.8556 | 0.8083 | 0.7547 | | |
| (7,1) | 0.9767 | 0.9366 | | | | | | | |
| (7,2) | 0.9767 | 0.9760 | 0.9616 | 0.9302 | 0.8842 | 0.8264 | 0.7595 | | |
| (7,3) | 0.9767 | 0.9758 | 0.9653 | 0.9497 | 0.9285 | 0.9011 | 0.8668 | 0.7241 | |
| (7,4) | 0.9767 | 0.9754 | 0.9611 | 0.9392 | 0.9103 | 0.8740 | 0.8303 | | |

FIG. 3A

|       | 0      | 0.001  | 0.01   | 0.02   | 0.03   | 0.04   | 0.05   | 0.08   | 0.1    |
|-------|--------|--------|--------|--------|--------|--------|--------|--------|--------|
| (2,2) | 0.7383 | 0.7349 |        |        |        |        |        |        |        |
| (2,3) | 0.7383 | 0.7332 |        |        |        |        |        |        |        |
| (3,1) | 0.9211 | 0.8993 | 0.7237 |        |        |        |        |        |        |
| (3,2) | 0.9211 | 0.9194 | 0.8987 | 0.8664 | 0.8256 | 0.7779 | 0.7247 |        |        |
| (3,3) | 0.9211 | 0.9185 | 0.8927 | 0.8587 | 0.8193 | 0.7748 | 0.7258 |        |        |
| (3,4) | 0.9211 | 0.9177 | 0.8822 | 0.8347 | 0.7797 | 0.7188 |        |        |        |
| (4,1) | 0.9785 | 0.9476 |        |        |        |        |        |        |        |
| (4,2) | 0.9785 | 0.9777 | 0.9650 | 0.9385 | 0.9002 | 0.8518 | 0.7952 |        |        |
| (4,3) | 0.9785 | 0.9775 | 0.9667 | 0.9503 | 0.9282 | 0.8999 | 0.8647 | 0.7214 |        |
| (4,4) | 0.9785 | 0.9771 | 0.9621 | 0.9386 | 0.9070 | 0.8670 | 0.8189 |        |        |
| (5,1) | 0.9944 | 0.9554 |        |        |        |        |        |        |        |
| (5,2) | 0.9944 | 0.9941 | 0.9840 | 0.9580 | 0.9178 | 0.8655 | 0.8035 |        |        |
| (5,3) | 0.9944 | 0.9940 | 0.9901 | 0.9827 | 0.9710 | 0.9535 | 0.9294 | 0.8120 |        |
| (5,4) | 0.9944 | 0.9939 | 0.9884 | 0.9783 | 0.9627 | 0.9402 | 0.9098 | 0.7681 |        |
| (6,1) | 0.9986 | 0.9517 |        |        |        |        |        |        |        |
| (6,2) | 0.9986 | 0.9984 | 0.9883 | 0.9597 | 0.9148 | 0.8563 | 0.7873 |        |        |
| (6,3) | 0.9986 | 0.9985 | 0.9970 | 0.9934 | 0.9863 | 0.9742 | 0.9561 | 0.8561 | 0.750  |
| (6,4) | 0.9986 | 0.9984 | 0.9965 | 0.9925 | 0.9854 | 0.9736 | 0.9558 | 0.8539 | 0.7429 |
| (7,1) | 0.9996 | 0.9452 |        |        |        |        |        |        |        |
| (7,2) | 0.9996 | 0.9995 | 0.9884 | 0.9560 | 0.9052 | 0.8394 | 0.7627 |        |        |
| (7,3) | 0.9996 | 0.9996 | 0.9990 | 0.9966 | 0.9912 | 0.9812 | 0.9654 | 0.8731 | 0.7706 |
| (7,4) | 0.9996 | 0.9996 | 0.9990 | 0.9974 | 0.9942 | 0.9882 | 0.9779 | 0.9066 | 0.8147 |

FIG. 3B

|       | 0      | 0.001  | 0.01   | 0.02   | 0.03   | 0.04   | 0.05   | 0.08   | 0.1    |
|-------|--------|--------|--------|--------|--------|--------|--------|--------|--------|
| (1,4) | 0.8240 | 0.8044 |        |        |        |        |        |        |        |
| (2,2) | 0.8240 | 0.8161 | 0.7467 |        |        |        |        |        |        |
| (2,3) | 0.9539 | 0.9475 | 0.8868 | 0.8148 | 0.7405 |        |        |        |        |
| (3,2) | 0.9539 | 0.9441 | 0.8582 | 0.7679 |        |        |        |        |        |
| (3,3) | 0.9942 | 0.9890 | 0.9415 | 0.8862 | 0.8369 | 0.7822 | 0.7223 |        |        |
| (3,4) | 0.9993 | 0.9967 | 0.9779 | 0.9475 | 0.9031 | 0.8460 | 0.7790 |        |        |
| (4,1) | 0.8240 | 0.8044 |        |        |        |        |        |        |        |
| (4,2) | 0.9883 | 0.9761 | 0.8703 | 0.7619 |        |        |        |        |        |
| (4,3) | 0.9993 | 0.9932 | 0.9755 | 0.9533 | 0.9217 | 0.8810 | 0.8322 |        |        |
| (4,4) | 1.0    | 0.9991 | 0.9947 | 0.9827 | 0.9610 | 0.9285 | 0.8847 |        |        |
| (5,1) | 0.9091 | 0.8823 |        |        |        |        |        |        |        |
| (5,2) | 0.9971 | 0.9821 | 0.8854 | 0.8504 | 0.8058 | 0.7533 |        |        |        |
| (5,3) | 0.9999 | 0.9968 | 0.9904 | 0.9754 | 0.9514 | 0.9183 | 0.8766 |        |        |
| (5,4) | 1.0    | 0.9999 | 0.9977 | 0.9909 | 0.9779 | 0.9572 | 0.9275 | 0.7810 |        |
| (6,1) | 0.9539 | 0.9201 |        |        |        |        |        |        |        |
| (6,2) | 0.9993 | 0.9814 | 0.9355 | 0.9031 | 0.8583 | 0.8035 | 0.7411 |        |        |
| (6,3) | 1.0    | 0.9991 | 0.9945 | 0.9813 | 0.9593 | 0.9284 | 0.8889 | 0.7254 |        |
| (6,4) | 1.0    | 1.0    | 0.9981 | 0.9927 | 0.9834 | 0.9677 | 0.9440 | 0.8216 |        |
| (7,1) | 0.9767 | 0.9366 |        |        |        |        |        |        |        |
| (7,2) | 0.9998 | 0.9790 | 0.9616 | 0.9302 | 0.8842 | 0.8267 | 0.7595 |        |        |
| (7,3) | 1.0    | 0.9998 | 0.9952 | 0.9816 | 0.9589 | 0.9271 | 0.8866 | 0.7241 |        |
| (7,4) | 1.0    | 1.0    | 0.9991 | 0.9969 | 0.9917 | 0.9818 | 0.9657 | 0.8653 | 0.7516 |

FIG. 4A

|       | 0      | 0.001  | 0.01   | 0.02   | 0.03   | 0.04   | 0.05   | 0.08   | 0.1    |
|-------|--------|--------|--------|--------|--------|--------|--------|--------|--------|
| (1,3) | 0.9211 | 0.9137 | 0.8435 | 0.7613 |        |        |        |        |        |
| (1,4) | 0.9785 | 0.9725 | 0.9031 | 0.8058 |        |        |        |        |        |
| (1,5) | 0.9944 | 0.9901 | 0.9192 | 0.8015 |        |        |        |        |        |
| (2,2) | 0.9785 | 0.9699 | 0.8942 | 0.8131 | 0.7356 |        |        |        |        |
| (2,3) | 0.9986 | 0.9944 | 0.9588 | 0.9291 | 0.8900 | 0.8423 | 0.7875 |        |        |
| (2,4) | 0.9999 | 0.9982 | 0.9914 | 0.9736 | 0.9426 | 0.8977 | 0.8400 |        |        |
| (2,5) | 1.0    | 0.9998 | 0.9965 | 0.9819 | 0.9492 | 0.8960 | 0.8242 |        |        |
| (3,1) | 0.9211 | 0.8993 | 0.7237 |        |        |        |        |        |        |
| (3,2) | 0.9986 | 0.9866 | 0.8987 | 0.8664 | 0.8256 | 0.7779 | 0.7248 |        |        |
| (3,3) | 1.0    | 0.9984 | 0.9939 | 0.9823 | 0.9630 | 0.9357 | 0.90   | 0.7481 |        |
| (3,4) | 1.0    | 1.0    | 0.9985 | 0.9937 | 0.9840 | 0.9678 | 0.9429 | 0.8071 |        |
| (4,1) | 0.9785 | 0.9476 | 0.7094 |        |        |        |        |        |        |
| (4,2) | 0.9999 | 0.9840 | 0.9650 | 0.9385 | 0.9002 | 0.8518 | 0.7952 |        |        |
| (4,3) | 1.0    | 0.9999 | 0.9965 | 0.9861 | 0.9686 | 0.9438 | 0.9116 | 0.7726 |        |
| (4,4) | 1.0    | 1.0    | 0.9995 | 0.9978 | 0.9935 | 0.9848 | 0.9698 | 0.8706 | 0.7611 |
| (5,1) | 0.9944 | 0.9554 |        |        |        |        |        |        |        |
| (5,2) | 1.0    | 0.9941 | 0.9840 | 0.9580 | 0.9178 | 0.8655 | 0.8035 |        |        |
| (5,3) | 1.0    | 1.0    | 0.9959 | 0.9837 | 0.9710 | 0.9535 | 0.9294 | 0.8120 |        |
| (5,4) | 1.0    | 1.0    | 0.9999 | 0.9991 | 0.9970 | 0.9924 | 0.9841 | 0.920  | 0.8311 |
| (5,5) | 1.0    | 1.0    | 1.0    | 0.9997 | 0.9988 | 0.9980 | 0.9938 | 0.9375 | 0.8427 |
| (6,1) | 0.9986 | 0.9517 |        |        |        |        |        |        |        |
| (6,2) | 1.0    | 0.9984 | 0.9883 | 0.9597 | 0.9149 | 0.8563 | 0.7873 |        |        |
| (6,3) | 1.0    | 1.0    | 0.9970 | 0.9934 | 0.9863 | 0.9743 | 0.9561 | 0.8561 | 0.750  |
| (6,4) | 1.0    | 1.0    | 0.9999 | 0.9992 | 0.9972 | 0.9933 | 0.9864 | 0.9357 | 0.8632 |
| (6,5) | 1.0    | 1.0    | 1.0    | 0.9999 | 0.9995 | 0.9980 | 0.9943 | 0.9596 | 0.8937 |
| (7,1) | 0.9996 | 0.9452 |        |        |        |        |        |        |        |
| (7,2) | 1.0    | 0.9995 | 0.9884 | 0.9561 | 0.9053 | 0.8394 | 0.7627 |        |        |
| (7,3) | 1.0    | 0.9999 | 0.9990 | 0.9966 | 0.9912 | 0.9812 | 0.9654 | 0.8731 | 0.7706 |
| (7,4) | 1.0    | 1.0    | 0.9999 | 0.9991 | 0.9969 | 0.9926 | 0.9855 | 0.9372 | 0.8715 |

FIG. 4B

LINEAR-OPTICAL ENCODED GHZ MEASUREMENTS AND FAULT-TOLERANT QUANTUM COMPUTATION AND COMMUNICATION

CROSS-REFERENCE TO RELATED APPLICATIONS

This application claims priority to United Kingdom Application No. GB2308274.6, "Linear-optical encoded GHZ measurements and fault-tolerant quantum computation," filed on Jun. 2, 2023 and priority to United Kingdom Application No. GB2300991.3, "Linear-optical encoded GHZ measurements and fault-tolerant quantum computation," filed on Jan. 24, 2023, each of which is hereby incorporated by reference in its entirety.

TECHNICAL FIELD

The present disclosure relates to quantum measurements and their application in fault-tolerant quantum computation and communication. In particular but not exclusively the present disclosure relates to methods and systems for performing a GHZ state measurement on encoded qubits, and on methods and systems for fault-tolerant measurement-based quantum computation.

BACKGROUND

Various physical systems have been considered for quantum information processing for quantum communication or quantum computation. Many architectures rely on embodying information in matter-based systems such as ions or spin states in quantum dots. An alternative is linear optics, in which information is encoded in electromagnetic field modes. In linear optics, linear optical components such as beamsplitters and phase shifters are used to manipulate quantum information encoded in electromagnetic field modes. Photon detectors are used to process and read out information. Photonic platforms provide many advantages including the ability to facilitate quicker gate operations compared to the decoherence time of quantum information, fast read-out measurements, and efficient qubit transfer. Furthermore, photonic systems can largely operate at room temperature.

There are however some challenges in using linear optics to process quantum information, in particular (i) the lack of deterministic entangling operations and (ii) the impact of photon loss (due, for example, to absorption of photons or leakage of photons from the linear optical system), and often these two challenges exacerbate one another. For example, one may be able to improve the theoretical probability of a successful entangling operation by increasing the number of optical components involved, but each additional optical component may introduce further photon loss, and therefore information loss, into the system. These challenges increase the difficulty of reliably constructing large, entangled states, such as the highly entangled cluster states that are typically required for measurement-based quantum computing. Besides measurement-based quantum computing, these challenges also apply to building quantum networks that rely on the distribution of shared entangled states for applications such as quantum key distribution and entanglement enhanced quantum sensing.

SUMMARY

It is an object of embodiments described herein to at least mitigate one or more problems in the art described above.

Linear optics lends itself as a promising platform for quantum information processing, and in particular for fault-tolerant quantum computation and quantum communication. In the present disclosure, n-qubit (n greater than or equal to 3) entangling operations are described. Specifically, efficient methods and systems to perform entangling measurements that project into the n-qubit Greenberger-Horne-Zeilinger (GHZ), or n-GHZ, basis in a nearly deterministic and loss-tolerant fashion are provided. Briefly, each of the n qubits is encoded as a Calderbank-Shor-Steane encoded qubit, and several of the qubits are further encoded in a repetition code (as explained further below in relation to FIGS. 1A-1E): the encoded n-qubit GHZ-state measurement comprises several encoded Bell state measurements on CSS-encoded qubits.

Furthermore, fault-tolerant measurement-based computation systems and methods are described that utilise the described encoded n-qubit GHZ-state measurements. In particular, a broad class of fault-tolerant cluster states may be constructed from encoded two-qubit cluster states. Consider the Raussendorf-Harrington-Goyal (RHG) lattice, which realises a fault-tolerant implementation of the surface code. Typically, in linear optics, resource states can be prepared at each vertex to be linked by Bell state measurements (BSMs), or their local-Clifford-equivalent, to create a RHG lattice on which single qubit measurements are performed to carry out quantum computation. Departing from this vertex-centric approach, in the present disclosure, encoded two-qubit cluster states are produced for edges of the lattice and are joined together by performing 4-GHZ measurements, which is substantially equivalent to performing both the creation of and computational measurements on a RHG lattice in one stroke. It is further demonstrated herein that the resource states of the edge-centric approach use fewer photons than those in the vertex-centric approach to achieve a higher single-photon loss threshold compared to known vertex-centric approaches.

According to an aspect of the present disclosure, an apparatus is provided for performing an encoded n-qubit GHZ state measurement on n encoded qubits (also referred to as logical qubits herein). The apparatus comprises an optical circuit and control logic. The optical circuit comprises an interferometer and a detector arrangement. The interferometer is arranged to (or configured to) receive, as a plurality of input optical modes, the n encoded qubits. The interferometer is further arranged to interfere the encoded qubits. The interferometer is further arranged to output the interfered encoded qubits as output optical modes. The detector arrangement comprises a plurality of photon detectors to measure a photon occupation of each of the output optical modes. Each encoded (logical) qubit comprises a first Calderbank-Shor-Steane-encoded (CSS-encoded) qubit. At least (n−2) of the encoded qubits further comprise a second CSS-encoded qubit, the first and second CSS-encoded qubits together comprising a repetition-encoded qubit. Each CSS-encoded qubit comprises a plurality of dual-rail encoded photonic qubits, each dual-rail encoded photonic qubit encoded as probability amplitudes corresponding to the photon occupation of two orthogonal optical modes. Interfering the encoded qubits comprises interfering a CSS-encoded qubit of the jth encoded qubit with a CSS-encoded qubit of the (j+1)th encoded qubit, for all j between 1 and n−1 (inclusive). Interfering a first CSS-encoded qubit with a second CSS-encoded qubit comprises interfering the optical modes of each dual-rail encoded photonic qubit of the first CSS-encoded qubit with the optical modes of a corresponding dual-rail encoded phonic qubit of the second CSS-encoded qubit. The control logic is coupled to the detector arrangement and is configured to: receive an indication from the detector arrangement whether a dual-rail Bell state measurement has been performed on each interfered pair of dual-rail encoded photonic qubits; and determine, from the indication, that an encoded n-qubit GHZ state measurement has been performed on the n encoded qubits.

In some examples, all n of the logical/encoded qubits may comprise a second CSS-encoded qubit, the first and second CSS-encoded qubits together comprising a repetition-encoded qubit. For example, interfering the encoded qubits may further comprise interfering a CSS-encoded qubit of the 1st encoded qubit with a CSS-encoded qubit of the nth encoded qubit.

In some examples, the optical modes may comprise spatial modes. In some examples, the optical modes may comprise polarisation modes. In some examples, the optical modes may comprise temporal modes.

In some examples, at least a portion of the apparatus may be implemented in a photonic integrated circuit.

In some examples, the detector arrangement may comprise a plurality of threshold detectors. In some examples, the detector arrangement may comprise a plurality of pseudo-threshold detectors. In some examples, the detector arrangement may comprise a plurality of photon number resolving (PNR) detectors.

In some examples, the control logic may be implemented in a field programmable gate array (FPGA) or an application specific integrated circuit (ASIC).

In some examples, the interferometer may comprise one or more active optical elements to selectively control the interference between a first dual-rail encoded photonic qubit and a second dual-rail encoded photonic qubit. The control logic may be coupled to the interferometer. The control logic may be further configured to generate one or more control signals to configure the one or more active optical elements to influence a type of dual-rail Bell state measurement (DR-BSM) that is performed on the interfered first and second dual-rail encoded photonic qubits. The control logic may be further configured to generate the one or more control signals in response to receiving an indication from the detector arrangement that a type of DR-BSM has been performed on interfered third and fourth dual-rail encoded photonic qubits. Advantageously, such an adaptive approach to performing DR-BSMs may improve the efficiency of an encoded Bell state measurement (E-BSM).

In some examples, each CSS-encoded qubit may comprise a quantum parity code (QPC) encoded qubit. Advantageously. QPC is known to satisfy some fundamental loss tolerances imposed by the non-cloning theorem.

According to an aspect of the present disclosure, a method is provided for performing an encoded n-qubit GHZ measurement on n encoded qubits (also referred to herein as logical qubits). The method comprises receiving, as a plurality of input optical modes, a number n of encoded qubits. The method further comprises interfering, in an interferometer, the encoded qubits and outputting the interfered encoded qubits as a plurality of output optical modes to a detector arrangement comprising a plurality of photon detectors. The method further comprises measuring, by the detector arrangement, a photon occupation of each of the output optical modes. The method further comprises determining, from the measurement, that an encoded n-qubit GHZ state measurement has been performed on the n encoded qubits. Each encoded qubit comprises a first CSS-encoded qubit. At least (n−2) of the encoded qubits further comprise a second CSS-encoded qubit, the first and second CSS-encoded qubits together comprising a repetition-encoded qubit. Each CSS-encoded qubit comprises a plurality of dual-rail encoded photonic qubits, each dual-rail encoded photonic qubit encoded as probability amplitudes corresponding to the photon occupation of two orthogonal optical modes. Interfering the encoded qubits comprises interfering a CSS-encoded qubit of the jth encoded qubit with a CSS-encoded qubit of the (j+1)th encoded qubit, for all j between 1 and n−1. Interfering a first CSS-encoded qubit with a second CSS-encoded qubit comprises interfering the optical modes of each dual-rail encoded photonic qubit of the first CSS-encoded qubit with the optical modes of a corresponding dual-rail encoded photonic qubit of the second CSS-encoded qubit. Determining that an encoded n-qubit GHZ state measurement has been performed on the n encoded qubits comprises: receiving an indication from the detector arrangement whether a dual-rail Bell state measurement has been performed on each interfered pair of dual-rail encoded photonic qubits; and determining, from the indication, that an encoded n-qubit GHZ state measurement has been performed on the n encoded qubits.

According to an aspect of the present disclosure a method for performing an encoded n-qubit GHZ measurement on n logical (encoded) qubits is provided. Each logical qubit comprises a first CSS-encoded qubit. At least (n−2) of the logical qubits further comprise a second CSS-encoded qubit, the first and second CSS-encoded qubits together comprising a repetition-encoded qubit. Each CSS-encoded qubit comprises a plurality of dual-rail encoded photonic qubits (DR-qubit), each DR-qubit encoded as probability amplitudes corresponding to the photon occupation of two orthogonal optical modes. The method comprises performing an encoded Bell state measurement (E-BSM) on a CSS-encoded qubit of the jth logical qubit and a CSS-encoded qubit of the (j+1)th logical qubit, for all j between 1 and n−1, wherein performing an E-BSM on a first CSS-encoded qubit and a second CSS-encoded qubit comprises performing a plurality of dual-rail Bell state measurements (DR-BSMs), each DR-BSM performed on a respective DR-qubit of the first CSS-encoded qubit and a corresponding DR-qubit of the second CSS-encoded qubit.

In some examples, all n of the logical qubits comprise a second CSS-encoded qubit, the first and second CSS-encoded qubits together comprising a repetition-encoded qubit, the method further comprising: performing an E-BSM on a CSS-encoded qubit of the 1st logical qubit and a CSS-encoded qubit of the nth logical qubit.

According to an aspect of the present disclosure, an apparatus is provided for performing an encoded n-qubit GHZ measurement on n logical qubits, wherein each logical qubit comprises a first CSS-encoded qubit: wherein at least (n−2) of the logical qubits further comprise a second CSS-encoded qubit, the first and second CSS-encoded qubits together comprising a repetition-encoded qubit; and wherein each CSS-encoded qubit comprises a plurality of dual-rail encoded photonic qubits (DR-qubit), each DR-qubit encoded as probability amplitudes corresponding to the photon occupation of two orthogonal optical modes. The apparatus comprises a plurality of encoded Bell state measurement (E-BSM) modules, each E-BSM module configured to perform an E-BSM on respective first and second CSS-encoded qubits. Each E-BSM module comprises a plurality of dual-rail Bell state measurement (DR-BSM) modules, each DR-BSM module configured to perform a DR-BSM on a respective DR-qubit of the first CSS-encoded qubit and a corresponding DR-qubit of the second CSS-encoded qubit. The apparatus is configured to perform the GHZ state measurement by performing an E-BSM on a CSS-encoded qubit of the jth logical qubit and a CSS-encoded qubit of the (j+1)th logical qubit, for all j between 1 and n−1.

In some examples, all n of the logical/encoded qubits may comprise a second CSS-encoded qubit, the first and second CSS-encoded qubits together comprising a repetition-encoded qubit. In some examples, the apparatus may be further configured to perform an E-BSM on a CSS-encoded qubit of the 1st encoded qubit and a CSS-encoded qubit of the nth encoded qubit.

In some examples, each DR-BSM is reconfigurable to perform a DR-BSM in one of a variety of guaranteed bases. For example, the control logic may be configured to reconfigure a first DR-BSM module to perform a DR-BSM of a first type (for example, in a first guaranteed basis) in response to an output received from one or more other DR-BSM modules configured to perform a DR-BSM of a second type (for example in a second guaranteed basis).

In some examples, each DR-BSM module is configured to perform a DR-BSM in a fixed guaranteed basis.

In some examples, performing a E-BSM may comprise performing an active E-BSM. In other examples, performing a E-BSM may comprise performing a passive E-BSM.

According to an aspect of the present disclosure, a method is provided for fault-tolerant measurement-based quantum computation using an implementation of an error correction code representable by a computational lattice comprising a plurality of vertices and a plurality of edges. The method comprises generating, for edges of the lattice, encoded two-qubit graph states (up to local Clifford operations). The method further comprises processing information by performing, for vertices of the lattice, encoded n-GHZ measurements on n encoded qubits of a number n two-qubit graph states, wherein n is at most the degree of the vertex. Each encoded qubit of an encoded two-qubit graph state comprises at least one CSS-encoded qubit. Each CSS-encoded qubit comprises a plurality of dual-rail encoded photonic qubits, each dual-rail encoded photonic qubit encoded as probability amplitudes corresponding to the photon occupation of two orthogonal optical modes.

In some examples, the performed n-GHZ measurements may be all of a first type (minimal n-GHZ), the first type comprising performance of an E-BSM on a CSS-encoded qubit of the jth logical qubit and a CSS-encoded qubit of the (j+1)th logical qubit for all j between 1 and n−1 (including j=1 and j=n−1).

In some examples, the performed n-GHZ measurements are of a second type (cyclic n-GHZ), the second type comprising: performance of an E-BSM on a CSS-encoded qubit of the jth encoded qubit and a CSS-encoded qubit of the (j+1)th encoded qubit for all j between 1 and (n−1); and performance of an E-BSM on a CSS-encoded qubit of the 1st encoded qubit and a CSS-encoded qubit of the nth encoded qubit.

In some examples, each CSS-encoded qubit may comprise a quantum parity code (QPC) encoded qubit.

In some examples, the computational lattice may comprise a Raussendorf-Harrington-Goyal lattice.

According to an aspect of the present disclosure, a system is provided for fault-tolerant measurement-based quantum computation. The system comprises a resource state generator. The resource state generator comprises a plurality of single photon sources configured to generate photons. The resource state generator further comprises a linear optical circuit, the linear optical circuit configured to receive the generated photons and probabilistically produce a plurality of encoded two-qubit graph states, up to local Clifford operations. The system further comprises a measurement apparatus configured to process information by performing encoded n-GHZ measurements on n encoded qubits of a number n of the generated two-qubit graph states.

In some examples, the system may further comprise a classical computing device. The classical computing device may be coupled, directly or indirectly, to the resource state generator and the measurement apparatus. The classical computing device may be configured to control the operation of the resource state generator and the measurement apparatus to perform a quantum algorithm. The classical computing device may be configured to construct an error syndrome graph to monitor errors in the performance of the quantum computation. The classical computing resource may be configured to correct errors based on the constructed error syndrome graph.

In some examples, the system may further comprise a user device. For example, the user device may provide a user interface through which a user can communicate a quantum algorithm to the classical computing device for performance using the resource state generator and measurement apparatus.

Many modifications and other embodiments of the disclosure set out herein will come to mind to a person skilled in the art to which these disclosure pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the spirit or scope of the disclosure.

BRIEF DESCRIPTION OF THE DRAWINGS

Embodiments of the disclosure will now be described by way of example only, with reference to the accompanying figures.

FIG. 2E shows an example table indicating the possible measurement outcomes from the dual-rail circuit of FIG. 2A.

FIG. 3A shows an example table of success probabilities for minimal 4-GHZ measurements comprising passive encoded Bell state measurements (E-BSMs) on QPC-encoded qubits.

FIG. 3B shows an example table of success probabilities for cyclic 4-GHZ measurements comprising passive encoded Bell state measurements (E-BSMs) on QPC-encoded qubits.

FIG. 4A shows an example table of success probabilities for minimal 4-GHZ measurements comprising active encoded Bell state measurements (E-BSMs) on QPC-encoded qubits.

FIG. 4B shows an example table of success probabilities for cyclic 4-GHZ measurements comprising active encoded Bell state measurements (E-BSMs) on QPC-encoded qubits.

Throughout the description and the drawings, like reference numerals refer to like parts. Furthermore, features in the drawings are not drawn to scale.

DETAILED DESCRIPTION

Figure 1A:
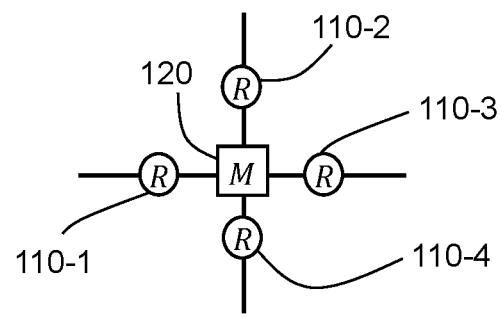
FIGS. 1A-1E provide example illustrations of an encoded GHZ state measurement on n encoded qubits.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed herein, but on the contrary, the intention is to cover all modifications, equivalents, and alternatives consistent with the present disclosure and the claims.

The scope of the claims appended hereto is not limited by any of the particular embodiments described below. For example, in any method or process described herein, the acts or operations of the method or process may be performed in any suitable sequence and are not necessarily limited to any particular disclosed sequence. Various operations may be described as multiple discrete operations in turn, in a manner that may be helpful in understanding certain embodiments: however, the order of description should not be construed to imply that these operations are order dependent. Additionally, the structures, systems, and/or devices described herein may be embodied using a variety of techniques that may not be described herein but that are known to the person skilled in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements can be present therebetween.

Any feature, structure, component, material, step, or method that is described and/or illustrated in any embodiment in this specification can be used with or instead of any feature, structure, component, material, step, or method that is described and/or illustrated in any other embodiment in this specification. Additionally, any feature, structure, component, material, step, or method that is described and/or illustrated in one embodiment may be absent from another embodiment.

The headings provided in this disclosure are for ease of reference only. The headings do not affect the construction or interpretation of the appended claims and the skilled person would appreciate that a feature or operation provided under one heading is compatible with a feature or operation provided under another heading unless those features are clearly incompatible, or it is explicitly stated that those features or operations are incompatible.

Firstly, common terminology and notation used throughout this specification will be provided. Next a description of methods and systems for performing encoded n-qubit GHZ state measurements are discussed, using "passive" or "active" encoded BSMs (E-BSMs). Next, methods and systems for an edge-centric approach to performing fault-tolerant measurement-based quantum computation are described.

Preliminaries

Just as a classical bit has a state—a computational basis state 0 or a computational basis state 1—a quantum bit (a "qubit") also has a state. A qubit may be in either of the computational basis states, in Dirac notation written as $|0\rangle$ and $|1\rangle$ respectively, or may be in a linear combination—a superposition—of those states e.g. $|\psi\rangle = a|0\rangle + b|1\rangle$. Abstractly, a qubit can be understood as a normalized vector in a two-dimensional Hilbert space. A projective measurement of the qubit in the computational basis will typically project the qubit onto either the 0 state or the 1 state with a probability dependent on the real or complex valued parameters a and b. As will be appreciated by the skilled person, quantum states may be pure or may be mixed.

By convention, the computational basis states $|0\rangle$ and $|1\rangle$ are eigenstates of the Pauli-Z operator, denoted "Z", with respective eigenvalues of +1 and −1. These computational basis states may thus be assigned column vectors:

$$|0\rangle \rightarrow \begin{pmatrix} 1 \\ 0 \end{pmatrix}, \quad |1\rangle \rightarrow \begin{pmatrix} 0 \\ 1 \end{pmatrix}. \quad \text{(EQ. 1)}$$

Using this basis, two non-commuting single-qubit operators relevant to the present disclosure are the Pauli-X and Pauli-Z operators, which may be represented in matrix form and are given here in the Z basis for completeness:

$$X = \begin{pmatrix} 0 & 1 \\ 1 & 0 \end{pmatrix}, \quad \text{(EQ. 2a)}$$

$$Z = \begin{pmatrix} 1 & 0 \\ 0 & -1 \end{pmatrix}. \quad \text{(EQ. 2b)}$$

The eigenstates of the X operator are given by:

$$|+\rangle = \frac{1}{\sqrt{2}}(|0\rangle + |1\rangle) \rightarrow \frac{1}{\sqrt{2}}\begin{pmatrix} 1 \\ 1 \end{pmatrix}, \quad \text{(EQ. 3a)}$$

-continued $$\text{and } |-\rangle = \frac{1}{\sqrt{2}}(|0\rangle - |1\rangle) \rightarrow \frac{1}{\sqrt{2}}\begin{pmatrix} 1 \\ -1 \end{pmatrix}. \quad \text{(EQ. 3b)}$$

Another useful single-qubit operator is the Hadamard operator, denoted H, which is given by:

$$H = \frac{1}{\sqrt{2}}\begin{pmatrix} 1 & 1 \\ 1 & -1 \end{pmatrix} \quad \text{(EQ. 4)}$$

and can be used to map the computational basis states to the eigenstates of the Pauli-X operator and vice versa.

Single qubit operators can be combined by tensor product to define multi-qubit operators. For example, the two-qubit operator X⊗X, which is often denoted as XX herein, performs an X operation on a first qubit and an X operation on the second qubit. Likewise, the two-qubit operator Z⊗Z, which is often denoted as ZZ herein, performs a Z operation on a first qubit and a Z operation on a second qubit.

Many of the advantages of quantum computing arise from the ability to create entangled states of multi-qubit systems. Two-qubit entangled states that are of particular relevance to the present disclosure are the Bell states, which can be written as:

$$|\psi_{kl}\rangle = |0, k\rangle + (-1)^l |1, 1-k\rangle, \quad \text{(EQ. 5)}$$

where the indices k and l may each take values 0 or 1. Note that the Bell states are simultaneous eigenstates of the two-qubit operators XX and ZZ, which correspond respectively to an X (Z) operation performed on the first qubit and a X (Z) performed on the second qubit. The eigenstates of the two-qubit operators XX and ZZ are denoted herein as xx and zz respectively and are related to the indices k and l via:

$$xx = (-1)^l \quad \text{(EQ. 6a)}$$

$$zz = (-1)^k, \quad \text{(EQ. 6b)}$$

and take values of +1 or −1.

Another concept for the present disclosure is the Bell state measurement (BSM). As used herein, a Bell state measurement is a projective measurement of a two-qubit input state onto a Bell state and can be thought of as a process to extract the eigenvalues xx and zz of the operators XX and ZZ respectively. In linear optics, BSMs are probabilistic. BSMs will be discussed in further detail below.

An example of a maximally entangled quantum state is a canonical n-qubit GHZ state (where n is an integer) defined (up to normalization) as:

$$|GHZ_{00...0}\rangle = \frac{1}{\sqrt{2}}(|0\rangle^{\otimes n} + |1\rangle^{\otimes n}). \quad \text{(EQ. 7)}$$

States that are equivalent to the canonical n-qubit GHZ state of (EQ. 7) up to local (single qubit) Clifford rotations are also known as n-qubit GHZ states: any n-qubit GHZ state may be transformed to a canonical n-qubit GHZ state via a sequence of one or more local (that is, single-qubit) operations.

As used herein, to perform a "n-qubit GHZ measurement" or "n-qubit GHZ state measurement" or "n-GHZ measurement" is understood to mean performing a measurement that probabilistically projects a number n of qubits onto an n-qubit GHZ state.

A logical qubit may be realized using one or more physical qubits. Physical qubits are understood to mean physical quantum systems, the quantum properties of which can be interpreted as qubit states. Many physical systems can be used to realize a physical qubit. Dynamically, quantum objects such as photons, electrons, ions and atoms obey the laws of quantum mechanics. In a physical quantum system, the quantum degrees of freedom within that physical quantum system are often referred to as modes. In photonic systems, a physical qubit may be described by the spatial modes of the photonic system (which paths or superpositions of paths the photons within the photonic system take), the temporal modes of the photonic system (which time bins or superpositions of time bins the photons within the photonic system are in), the polarisation modes of the photonic system (for example, whether the photons of the photonic system are horizontally polarized, vertically polarized, or some superposition of the two), the frequency modes of the photonic system (which frequencies or superpositions of frequencies the photons within the photonic system are in) or any intersection of these modes (for example, the quantum state of photons in a waveguide is often described in terms of spatiotemporal modes).

Photonic qubit states may be "dual-rail encoded", which means that the value of a physical qubit can be expressed in terms of which of two modes a photon resides in. That is, the physical qubit may be considered to be in a computational basis state |0⟩ if the photon is in a first mode, while the physical qubit may be considered to be in a computational basis state |1⟩ if the photon is in a second mode orthogonal to the first mode. The dual-rail qubit may be described by a superposition state if the photon is in a superposition of the first and second modes. Without loss of generality, in the dual-rail encoding, the dual-rail encoded computational basis states $|0\rangle_{DR}$ and $|1\rangle_{DR}$ can be expressed as:

$$|0\rangle_{DR} = |1_1, 0_2\rangle, \quad \text{(EQ. 8a)}$$

and $$|1\rangle_{DR} = |0_1, 1_2\rangle \quad \text{(EQ. 8b)}$$

where the subscripts 1 and 2 refer to first and second orthogonal modes respectively, and the corresponding 0 or 1 value represents the number of photons in that mode. For example, photonic qubit basis states may be dual-rail encoded in spatial modes such that a $|0\rangle_{DR}$ is represented by the presence of a photon in a first optical path and a $|1\rangle_{DR}$ is represented by the presence of a photon in a second optical path. For example, photonic qubit basis states may be dual-rail encoded in polarisation modes such that a $|0\rangle_{DR}$ is represented by a horizontally polarized photon and a $|1\rangle_{DR}$ is represented by a vertically polarized photon.

As used herein, the terms "physical qubit", "dual-rail encoded qubit", "dual-rail encoded photonic qubit" and "DR-qubit" may be used interchangeably. Furthermore, when used with a quantum state the subscript "DR" is often used herein to denote a dual-rail encoded photonic state.

Typically, a DR-qubit is not used as a logical qubit because physical errors such as photon loss would destroy the quantum information being processed. Instead a logical qubit may be realised using multiple DR-qubits and a quantum error correcting code. One large class of quantum error correcting codes is the Calderbank-Shor-Steane codes, more typically known as CSS codes. CSS codes are an important subclass of the more general class of stabilizer codes.

An example of a CSS-encoding is the Quantum Parity Code (QPC) encoding, denoted herein as QPC(m1, m2) where m1 and m2 are integers. Under the QPC(m1, m2) encoding, the logical computational basis states are given by:

$$|0^{(m1,m2)}\rangle := |+^{(m2)}\rangle^{\otimes m1} \tag{EQ. 9a}$$

$$= \left[\frac{1}{\sqrt{2}}(|0^{(m2)}\rangle + |1^{(m2)}\rangle)\right]^{\otimes m1} + \left[\frac{1}{\sqrt{2}}(|0^{(m2)}\rangle + |1^{(m2)}\rangle)\right]^{\otimes m1}$$

$$|1^{(m1,m2)}\rangle := |-^{(m2)}\rangle^{\otimes m1} \tag{EQ. 9b}$$

$$= \left[\frac{1}{\sqrt{2}}(|0^{(m2)}\rangle + |1^{(m2)}\rangle)\right]^{\otimes m1} - \left[\frac{1}{\sqrt{2}}(|0^{(m2)}\rangle - |1^{(m2)}\rangle)\right]^{\otimes m1}$$

with $$|0^{(m2)}\rangle := |0\rangle_{DR}^{\otimes m2}, \tag{EQ. 10a}$$

$$\text{and } |1^{(m2)}\rangle := |1\rangle_{DR}^{\otimes m2}. \tag{EQ. 10b}$$

In a variation of the QPC encoding described above, logical qubits may be defined in a rotated basis. For example, if in a Hadamard basis, the logical 0 and 1 states of (EQ. 9) may correspond to the logical plus and minus states in the Hadamard basis. The skilled person would appreciate that for the purposes of the present disclosure, the term QPC encoding is also intended to encompass rotated QPC encodings.

As used herein, a "logical qubit" or "encoded qubit" is understood to mean a logical qubit realised from multiple DR-qubits according to some error-correcting code. As will be appreciated by the skilled person upon reading this specification, each logical qubit comprises a (first) CSS-encoded qubit, and at least (n−2) of the n encoded qubits subject to a GHZ state measurement are further concatenated in a repetition code—that is, comprise a second CSS-encoded qubit, the first and second CSS-encoded qubits together comprising a repetition-encoded qubit, as described further below in relation to FIGS. 1A-1E. The skilled person will appreciate that each "logical qubit" is accordingly itself a CSS-encoded qubit, but for ease of reference will not be referred to as such herein.

n-Qubit GHZ State Measurements

Generally speaking, the n-GHZ basis states, defined over logical (encoded) qubits labelled j=1, 2, . . . , n are uniquely specified by their eigenvalues under a set of n operators $\bar{S}_j$, which are given by $$\bar{S}_j = \begin{cases} \bar{Z}_j \bar{Z}_{j+1}, & \text{for } j = 1, 2, \ldots, n-1 \\ \bar{X}_1 \bar{X}_2 \ldots \bar{X}_n, & \text{for } j-n \end{cases}, \tag{EQ. 11}$$

Where $\bar{X}_j$ and $\bar{Z}_j$ represent the Pauli-X operator and the Pauli-Z operators acting on the jth encoded qubit respectively. The bar symbol above the operators is used to label logical operators that act upon encoded qubits. The notation $|GHZ_{s_1 s_2 \ldots s_n}\rangle$ is used to refer to each GHZ state where the subscripts $s_j$ each take value 0 or 1 to indicate the eigenvalue of the state under each of the operators $\bar{S}_j$, in particular $$\bar{S}_j |GHZ_{s_1 s_2 \ldots s_n}\rangle = (-1)^{s_j} |GHZ_{s_1 s_2 \ldots s_n}\rangle. \tag{EQ. 12}$$

With this notation, the canonical n-qubit GHZ state (EQ. 7) is denoted $|GHZ_{00 \ldots 0}\rangle$.

The task of performing an encoded n-qubit GHZ state measurement is to obtain the eigenvalues of an input state under the operators in (EQ. 11), or equivalently to project the input state onto the complete orthonormal basis $\{|GHZ_{s_1 s_2 \ldots s_n}\rangle \mid s_j=0, 1 \ \forall j=1, 2, \ldots, n\}$.

Figure 1B:
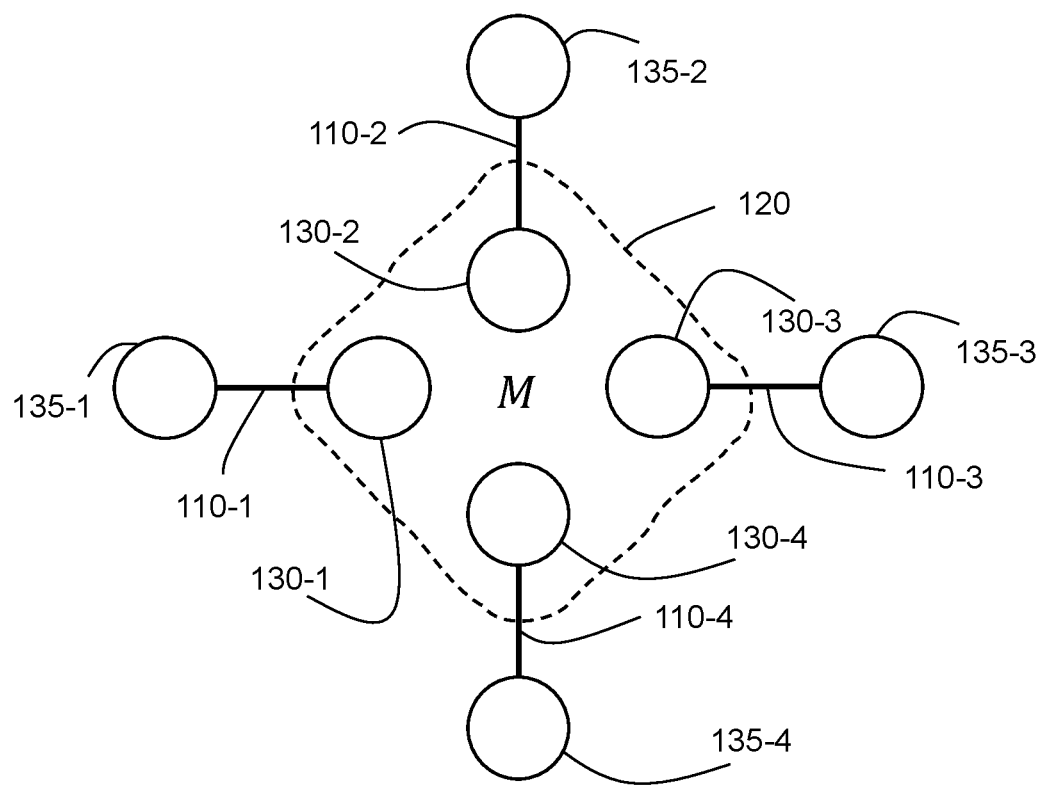

To aid in explaining the different levels of encoding involved, reference will be made to the illustrations of FIGS. 1A-1D, in which a n-qubit GHZ state measurement 120 is performed on n logical qubits 130 to generate a larger entangled state from n two-qubit resource states 110. In FIGS. 1A-1D, the number n of encoded qubits subject to an encoded n-qubit GHZ state measurement 120 is four, but the skilled person would appreciate that the number may be greater or fewer. More specifically, in FIG. 1A, a 4-qubit GHZ state measurement (also labelled with an "M" in the figure) is performed to entangle four two-qubit resource states 110-1, 110-2, 110-3, 110-4 (also labelled with an "R" in the figure). Each two-qubit resource state 110-j comprises two entangled encoded qubits 130-j and 135-j (j=1, 2, 3, 4) as illustrated in FIG. 1B and the measurement 120 (indicated with dashed line in FIG. 1B) is performed on the encoded qubits 130. For example, the resource states 110-1 to 110-4 may each comprise a two-qubit linear chain graph state (given by $$\left(\frac{1}{\sqrt{2}}\right)(|0 +\rangle + |1 -\rangle))$$

which may be referred to as a "two-chain" and is equivalent to a Bell state up to a Hadamard gate.

For a fixed index j between 2 and n−1 observe that in (EQ. 11) a factor of $\bar{Z}_j$ is involved in two operators. $\bar{S}_{j-1}$ and $\bar{S}_j$. This would ordinarily present difficulties in linear optical systems as repeated destructive measurements of the same dual-rail encoded photonic qubit are impossible. However, in the present disclosure, this obstacle is addressed by encoding the jth qubit (j between 2 and n−1) in a repetition encoding, for example the two-qubit repetition encoding given by $|0\rangle \to |00\rangle$ and $|1\rangle \to |11\rangle$. In other words, each logical qubit comprises a Calderbank-Shor-Steane-encoded qubit (CSS-encoded qubit), and at least (n−2) of the encoded qubits further comprise a second CSS-encoded qubit, the first and second CSS-encoded qubits together comprising a repetition-encoded qubit.

Figure 1C:
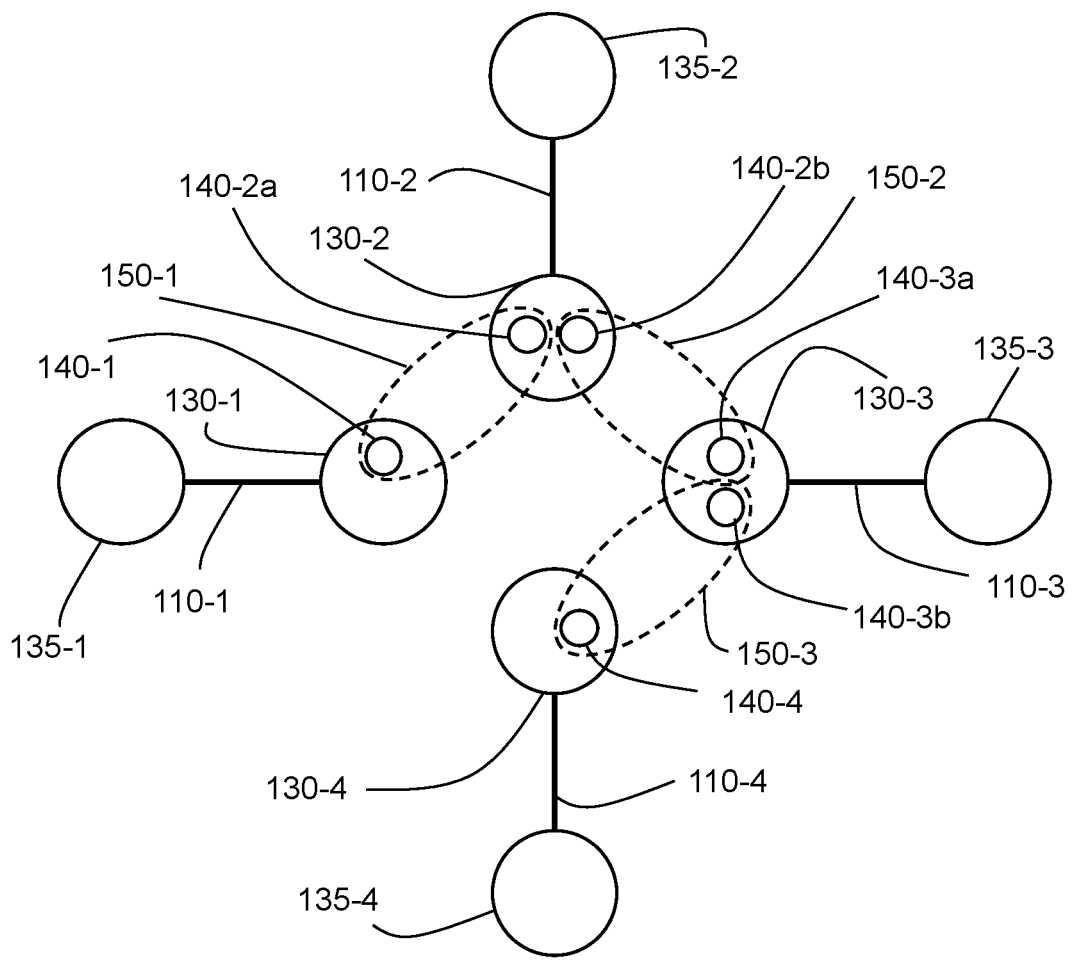

This is depicted in FIG. 1C. In FIG. 1C, two of the four encoded qubits comprise first and second CSS-encoded qubits, the first and second CSS-encoded qubits together comprising a repetition-encoded qubit. More particularly, the first encoded qubit 130-1 comprises a CSS-encoded qubit 140-1 and the fourth encoded qubit 130-4 comprises a CSS-encoded qubit 140-4. Each of the second and third encoded qubits 130-2 and 130-3 each comprise a first CSS-encoded qubit (140-2a and 140-3a respectively) and a second CSS-encoded qubit (140-2b and 140-3b respectively), the respective first and second CSS-encoded qubits together comprising a repetition-encoded qubit (130-2 and 130-3 respectively).

Under a two-qubit repetition code, each encoded qubit 130-j (j between 2 and n−1) comprises two CSS-encoded qubits, and their corresponding operators are labelled with subscripts j, a and j, b which are constrained by $Z_{j,a}Z_{j,b}=+1$. Under this two-qubit repetition encoding, the logical operators from (EQ. 11) are accordingly defined as $$\overline{X}_j = \begin{cases} X_j, & j=1, n \\ X_{j,a} X_{j,b}, & 1 < j < n \end{cases} \quad \text{(EQ. 13a)}$$

$$\overline{Z}_j = \begin{cases} Z_j, & j=1, n \\ Z_{j,a} \sim Z_{j,b}, & 1 < j < n \end{cases} \quad \text{(EQ. 13b)}$$

where the symbol (~) is used to indicate logical equivalence. The logical n-qubit GHZ state measurement is realised by performing encoded Bell state measurements (E-BSMs) between pairs of CSS-encoded qubits. More specifically, the encoded n-qubit GHZ state measurement on n encoded qubits is performed by measuring the operators $\{Z_{j,b}Z_{j+1,a}\}$ and $\{X_{j,b}X_{j+1,a}\}$ for all 1<j<n as well as $\{Z_1 Z_{2,a}\}$, $\{X_1 X_{2,a}\}$ and $\{Z_{n-1,b}Z_n\}$ $\{X_{n-1,b}X_n\}$. At the logical level, the encoded operators $Z_{j,b}Z_{j+1,a}=\overline{Z}_j\overline{Z}_{j+1}$, so the results of the E-BSMs enable the values of the logical Si operators to be determined for j=1, 2, . . . , n−1. Furthermore, by taking a product of all of the $X_{j,b}X_{j+1,a}$ results, the value of the logical operator $\overline{S}_n$ is also determined. Crucially, no combination of these results reveals any local $\overline{Z}_j$, which anti-commutes with $\overline{S}_n$ and thus would have rendered a product state.

With reference again to the example shown in FIG. 1C, an E-BSM 150-1 is performed on CSS-encoded qubit 140-1 and CSS-encoded qubit 140-2a, an E-BSM 150-2 is performed on CSS-encoded qubit 140-2b and CSS-encoded qubit 140-3a, and an E-BSM 150-3 is performed on CSS-encoded qubit 140-3b and CSS-encoded qubit 140-4.

Figure 1D:
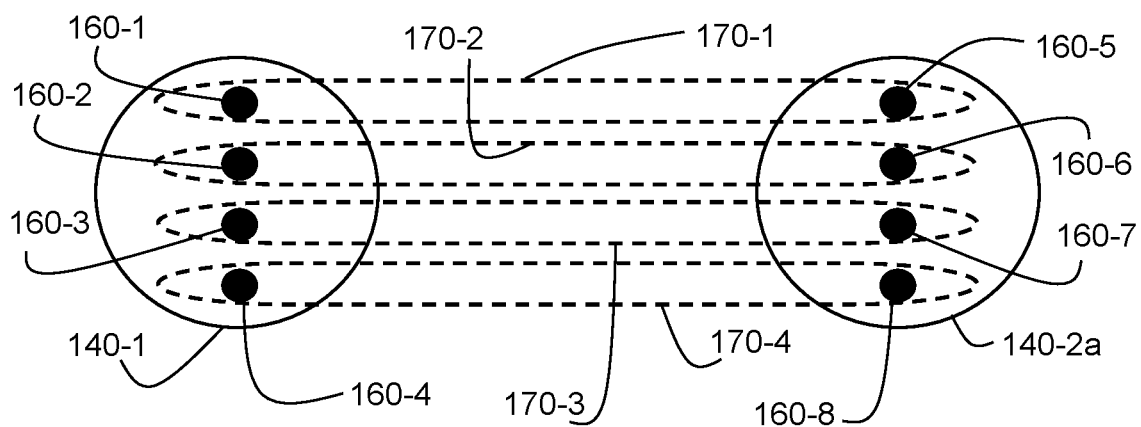

Each CSS-encoded qubit comprises a plurality of dual-rail encoded photonic qubits (also referred to as DR-qubits), each dual-rail encoded photonic qubit encoded as a probability amplitudes corresponding to the photon occupation of two orthogonal optical modes. With reference to FIG. 1D, CSS-encoded qubit 140-1 comprises DR-qubits 160-1 to 160-4 and CSS-encoded qubit 140-2a comprises DR-qubits 160-5 to 160-8. While each CSS-encoded qubit is depicted as comprising four DR-qubits in FIG. 1D, the skilled person will appreciate that this need not be the case and that the number of DR-qubits depends on the CSS-encoded qubit used. For example, when a QPC code QPC(m1, m2) is used, each QPC-encoded qubit comprises m1×m2 DR-qubits and accordingly uses m1×m2 photons.

Each E-BSM on first and second CSS-encoded qubits (e.g. 140-1 and 140-2a) comprises a plurality of dual-rail BSMs (DR-BSMs) between a DR-qubit of the first CSS-encoded qubit and a DR-qubit of the second CSS-encoded qubit. For example, when a QPC code QPC(m1, m2) is used, each E-BSM may comprise m1×m2 DR-BSMs. DR-BSMs are indicated by the dashed ellipses 170-1, 170-2, 170-3 and 170-4 in FIG. 1D. An indication that DR-BSMs 170 have been successfully performed on the DR-qubits 160 of two CSS-encoded qubits may in turn indicate the successful performance of an E-BSM 150 on the CSS-encoded qubits 130 to which those DR-qubits 160 belong. An indication that E-BSMs 150 have been successfully performed on the CSS-encoded qubits in turn indicates the successful performance of an encoded 4-qubit GHZ state measurement 120 on the four encoded qubits 130-1, 130-2, 130-3 and 130-4.

A dual-rail Bell state measurement (DR-BSM) is a Bell state measurement performed on two dual-rail encoded photonic qubits. DR-BSMs are inherently probabilistic, and it is known that the maximal efficiency of a DR-BSM with standard linear optical tools (beamsplitters, phase shifters and photon detectors) is limited to one half. A DR-BSM can be thought of as a process to extract the eigenvalues xx, zz of the operators XX and ZZ at the dual-rail qubit level (that is, at the two-photon level).

Figure 2A:
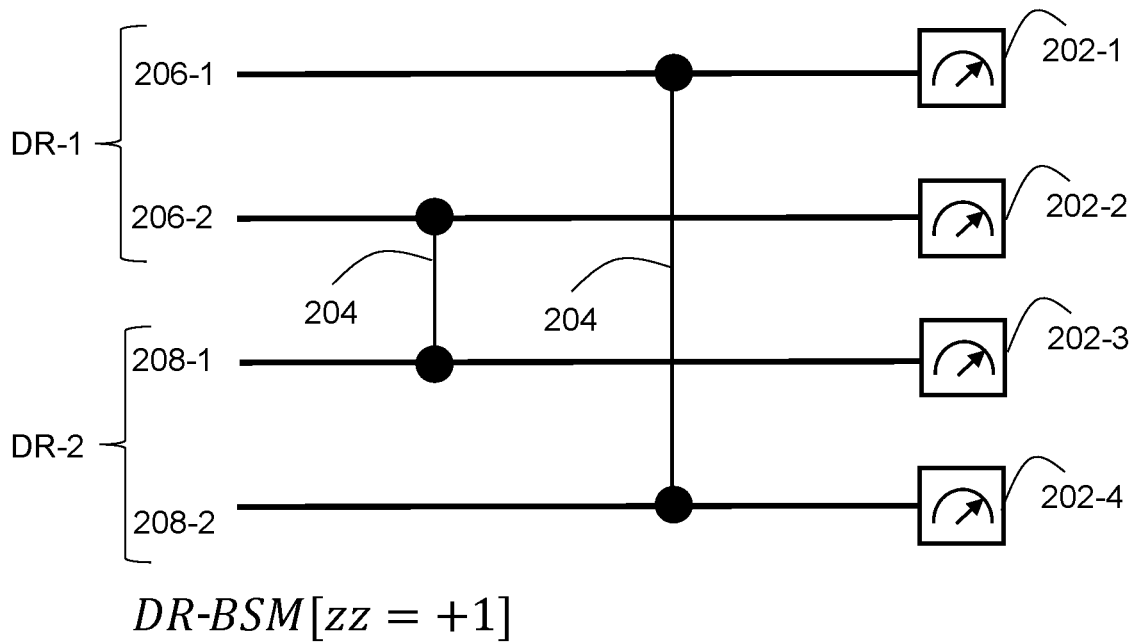
FIGS. 2A-2D depict example dual-rail linear optical circuit diagrams for implementing dual-rail Bell state measurements (DR-BSMs).

FIG. 2A depicts a diagram of a first dual-rail linear optical circuit for implementing a DR-BSM. Each horizontal line in FIG. 2A represents an optical mode. Each vertical line represents a beamsplitter interaction 204. The term "beamsplitter interaction" as used herein is understood to mean a mode coupling interaction that couples two input modes to two output modes in a same or similar manner to the way in which a beamsplitter would. A first input physical qubit (DR-1) is encoded as probability amplitudes corresponding to the photon occupation of the topmost two orthogonal optical modes (206-1, 206-2) indicated in the figure, and a second input physical qubit (DR-2) is encoded as probability amplitudes corresponding to the photon occupation of the bottommost two orthogonal optical modes (208-1, 208-2) indicated in the figure. For example, if a photon is present in first optical mode 206-1 and no photon is present in second optical mode 206-2 then the physical qubit DR-1 is in a computational basis state $|0\rangle_{DR}$; if a photon is present in the second optical mode 206-2 and no photon is present in first optical mode 206-1 then the input physical qubit DR-1 is in a computational basis state $|1\rangle_{DR}$; if a photon is in a superposition of being in the first mode 206-1 and the second mode 206-2, then the physical qubit DR-1 is in a superposition state. A first 50/50 beamsplitter interaction 204 is performed between the second mode 206-2 of the first qubit DR-1 and the first mode 208-1 of the second qubit DR-2. A second 50/50 beamsplitter interaction 204 is also performed between the first mode 206-1 of the first qubit DR-1 and the second mode 208-2 of the second qubit DR-2. As the two beamsplitter interactions of FIG. 2A are performed on different qubits, the order of the two beamsplitter interactions 204 may be swapped or they may be performed at the same time. After the beamsplitter interactions, measurements 202 of the photon occupation of each output mode are performed, as indicated by the four measurement symbols (202-1 to 202-4) in the figure. The measurements may be photon number resolving measurements capable of determining a number of photons in each output mode. The measurements may be on/off measurements capable of determining the presence or absence of photons in each output mode. The measurements may be pseudo-threshold measurements capable of determining whether each mode comprises zero, one or more than one photon.

The first column of the table of FIG. 2E shows the measurement outcomes that may be produced in response to the linear optical circuit of FIG. 2A receiving a two-qubit dual-rail encoded state formed of two photons. For example. "(1,1,0,0)" indicates that the measured photon occupation 202-1 of the optical mode 206-1 is one photon, the measured photon occupation 202-2 of the optical mode 206-2 is one photon, and the measured photon occupations (202-3 and 202-4) are zero photons. The second column of the table of FIG. 2E, indicates the input state that can be inferred to have been measured based on the corresponding measurement pattern indicated in the first column. For example, if one photon is measured in mode 206-1 and one photon is measured in 206-2 while no photons are measured in modes 208-1 and 208-2, then it can be inferred that the DR-BSM was successful and the dual-rail encoded input state that was measured by the optical circuit of FIG. 2A was a Bell state. The third and fourth columns of the table of FIG. 2E respectively indicate the zz and xx eigenvalues that the detection pattern implies.

Figure 2B:
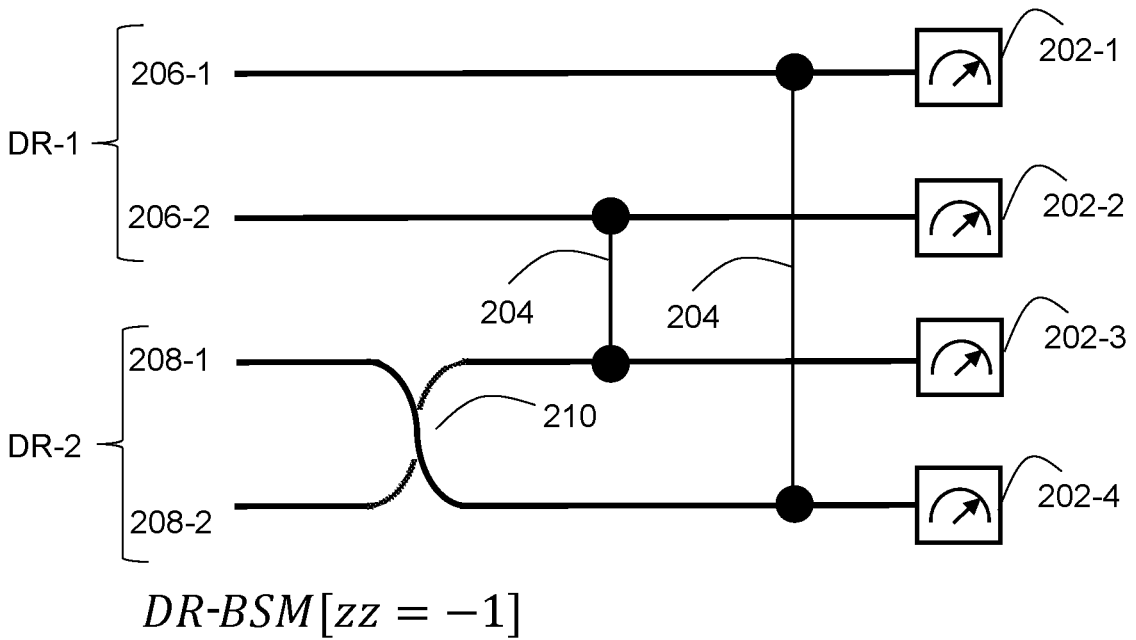
Figure 2C:
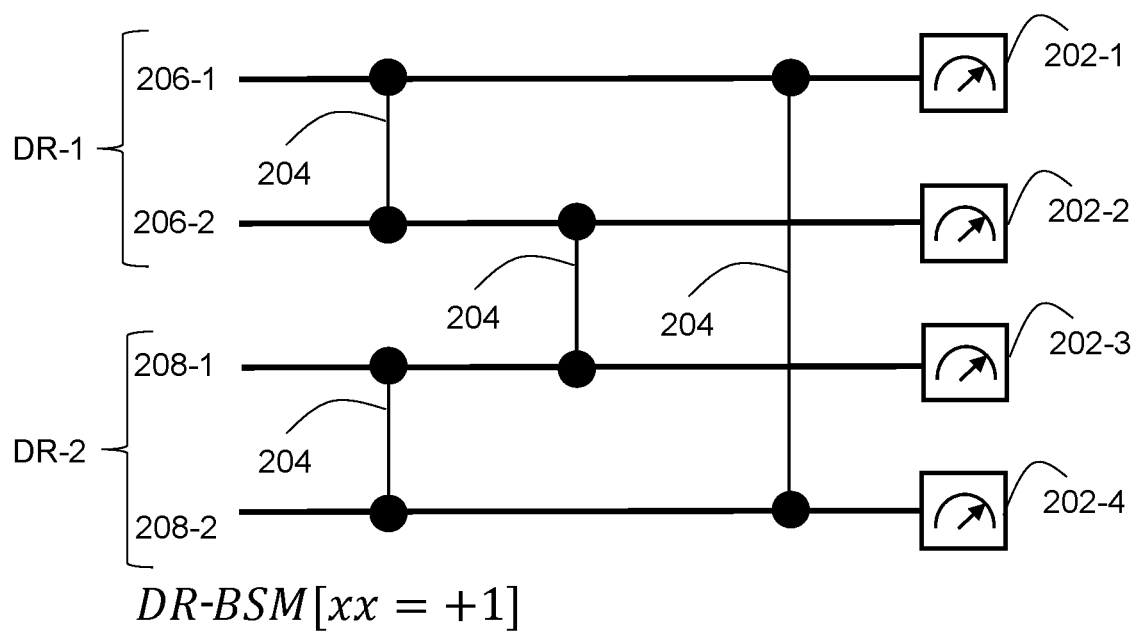
Figure 2D:
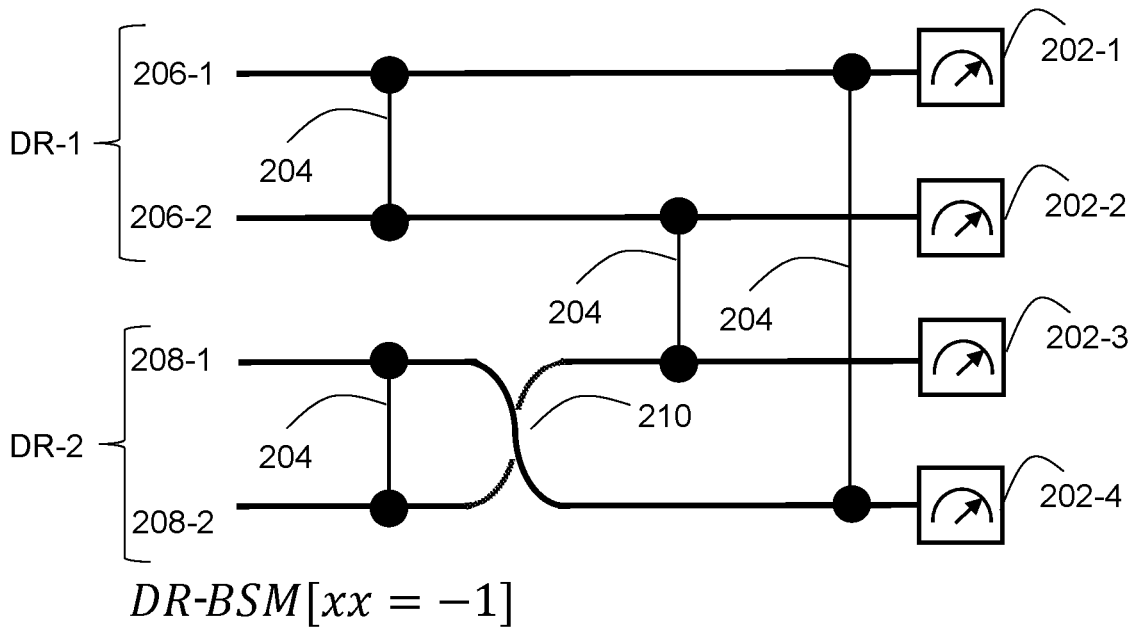

As indicated in the table of FIG. 2E, the linear optical circuit of FIG. 2A is configured to perform an equal-weight projection of the input state onto the dual-rail encoded Bell states $|\psi_{00}\rangle_{DR}$ and $|\psi_{01}\rangle_{DR}$ and each of the separable states indicated in the table. The two input states onto which the optical circuit can project a two-qubit input state have differing xx eigenvalues and share a zz eigenvalue of +1. For the purposes of the present disclosure, this optical circuit is said to have a "guaranteed basis" of ZZ and may be denoted as DR-BSM[zz=+1]. Each of FIGS. 2B, 2C and 2D show diagrams of alternative DR-BSM optical circuits to that of FIG. 2A. The DR-BSM circuit of FIG. 2B also has a guaranteed ZZ basis and the two Bell states onto which the circuit projects a two-qubit dual-rail encoded input state share a zz eigenvalue of −1. The optical circuit of FIG. 2B is similar to that of FIG. 2A except that an optical swap operation 210 is performed between the modes of one DR-qubit (in this example, 208-1 and 208-2). The DR-BSM circuit of FIG. 2B may be denoted DR-BSM[zz=−1]. The DR-BSM circuit of FIG. 2C has a guaranteed XX basis and the two Bell states onto which the circuit projects a two-qubit dual-rail encoded input state share a xx eigenvalue of +1. The DR-BSM circuit of FIG. 2C may be denoted DR-BSM[xx=+1]. The DR-BSM circuit of FIG. 2D also has a guaranteed XX basis and the two Bell states onto which the circuit projects a two-qubit dual-rail encoded input state share a xx eigenvalue of −1. The DR-BSM circuit of FIG. 2D may be denoted DR-BSM[xx=−1]. The skilled person will appreciate that alternative DR-BSM circuits to those depicted in FIGS. 2A-2D may be utilised.

With reference again to FIG. 1D, in some examples the DR-BSMs 170 may be of the same type (e.g. may all be of type DR-BSM[zz=−1]) or may be of different types (e.g., some may be of a first type (e.g. DR-BSM[zz=−1]) and others may be of a second type (e.g. DR-BSM[xx=+1]) or a third type (e.g. DR-BSM[xx=−1])). The choice of the CSS encoding, the desired guaranteed basis of the encoded E-BSMs 150 or the method of performing the E-BSMs 150 may influence the choice of DR-BSM type. In some examples, all DR-BSMs 170) are performed simultaneously. In other examples, the DR-BSMs may be performed in sequential batches. For example, in response to a determination that a first DR-BSM of a first type has failed (e.g. 170-2), a second DR-BSM (e.g. 170-3) may be performed having a second type, different to the first type. As indicated further below, such an active scheme for choice of DR-BSM can lead to improved probabilities of success with E-BSMs 150 and therefore improved probabilities of success with the n-GHZ measurement 120.

Each E-BSM is inherently probabilistic. By viewing a E-BSM as a process to extract the eigenvalues of the operators XX and ZZ, one can summarise the outcomes based on whether one can infer (i) both, (ii) one, or (iii) none of the desired eigenvalues. The probabilities of these three possibilities are denoted by (i) p(xx, zz), (ii) p(no xx, zz) or p(xx, no zz) and (iii) p(no xx, no zz) respectively. From these probabilities, one can obtain the probabilities of extracting the eigenvalues of the operators XX and ZZ: p(xx)=p(xx, zz)+p(xx, no zz) and p(zz)=p(xx, zz)+p(no xx, zz). In the absence of loss, outcomes (i) and (ii) are the only possibilities. Only when the effect of loss is included does (iii) become possible.

With reference again to FIG. 1C, the n-GHZ measurement 120 comprises a plurality of E-BSMs 150. If any E-BSM 150 fails to return eigenvalue zz then one cannot infer $\bar{Z}_j\bar{Z}_{j+1}$ for some value j, and if any E-BSM 150 fails to return eigenvalue xx then one cannot infer $\Pi_i \bar{X}_i$.

As used herein, a n-qubit GHZ state measurement comprising (n−1) E-BSMs such as that shown in FIG. 1C is referred to as a "minimal n-GHZ measurement". A minimal n-GHZ measurement succeeds only when every E-BSM returns full information, which occurs with probability $$P_{minimal\ n-GHZ} = p(xx, zz)^{n-1}. \qquad \text{(EQ. 14)}$$

A failed minimal n-GHZ measurement 120 will lead to losing one or more of the n eigenvalues $s_j$ of the operators $\bar{S}_j$ (see (EQ. 11)). By using CSS-encoded qubits, the chance of failure of an E-BSM due to photon loss is reduced, and one can select a CSS-encoding that makes each E-BSM and therefore each minimal n-GHZ measurement, nearly deterministic.

As an alternative to a minimal n-GHZ measurement, one can expand (EQ. 11) with additional commuting operators, resulting in an over-complete set of commuting operators, such that it now tolerates a E-BSM that returns xx but not zz. In particular, one can encode the end qubits (130-1 and 130-4 in the figure) with the same two-qubit repetition code and measure $\{Z_{j,b}Z_{j+1,a}\}$ and $\{X_{j,b}X_{j+1,a}\}$ for all $1 \leq j < n$ as well as $\{Z_{1,a}Z_{n,b}\}$, $\{X_{1,a}X_{n,b}\}$ using E-BSMs. As long as any n−1 of the E-BSMs provide both xx and zz, while the remaining E-BSM provides the xx eigenvalue, one can infer the eigenvalues of all $\bar{S}_i$ operators, which specify a GHZ state. This is depicted in FIG. 1E, in which encoded qubits 130-1 and 130-4 each comprise a first CSS-encoded qubits (140-1a and 140-4a respectively) and a second CSS-encoded qubit (140-1b and 140-4b respectively), the first and second CSS-encoded qubits together comprising a repetition-encoded qubit (130-1 and 130-4), and additional E-BSM 150-4 is performed on CSS-encoded qubits 140-1a and 140-4b.

Figure 1E:
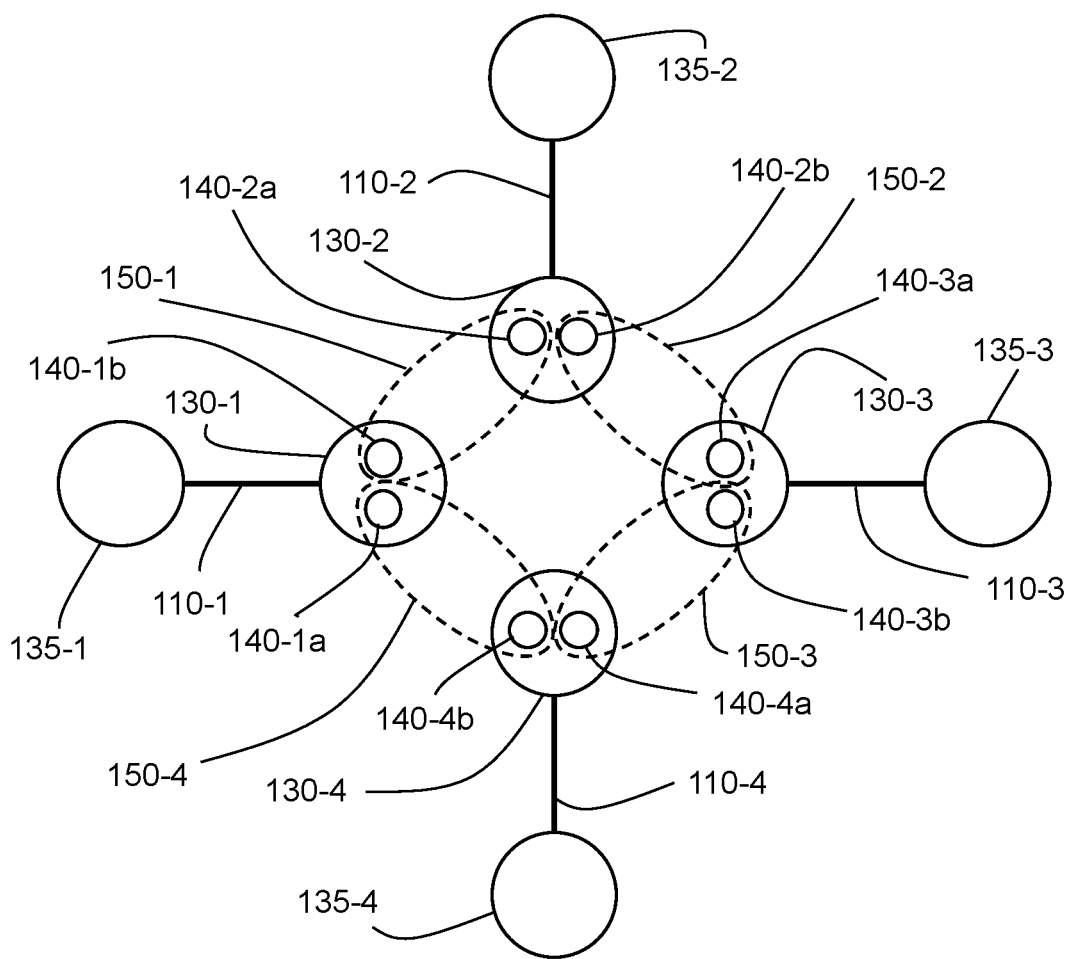

As used herein, a n-qubit GHZ state measurement comprising n E-BSMs such as that shown in FIG. 1E is referred to as a "cyclic n-GHZ measurement".

The success probability for a cyclic n-GHZ, is given by $$P_{cyclic\ n-GHZ} = p(xx, zz)^n + n \cdot p(xx, zz)^{n-1} p(xx, no\ zz). \qquad \text{(EQ. 15)}$$

A cyclic n-GHZ measurement failure can lead to losing one or more of the n eigenvalues $s_j$ of the operators $\overline{S}_j$ (see (EQ. 11)). Once again, by using CSS-encoded qubits, the chance of failure of an E-BSM due to photon loss is reduced, and one can select a CSS-encoding that makes each E-BSM and therefore each cyclic n-GHZ measurement, nearly deterministic.

To illustrate the efficacy of the minimal n-GHZ and cyclic n-GHZ measurement schemes, examples will now be discussed in which an encoded GHZ state measurement 120 is performed on n=4 logical qubits 130, and wherein a CSS-encoded qubit 140 comprises a QPC-encoded qubit (EQs. 11 and 12). Under a QPC(m1, m2) encoding, the QPC-encoded Bell states are given by:

$$|\Psi_{00}^{(m1,m2)}\rangle = \left(\frac{1}{\sqrt{2}}\right)^{m1-1} \sum_{k:even}^{m1} \mathcal{F}\left[|\Psi_{00}^{(m2)}\rangle^{\otimes m1-k} |\Psi_{10}^{(m2)}\rangle^{\otimes k}\right], \quad \text{(EQ. 16a)}$$

$$|\Psi_{01}^{(m1,m2)}\rangle = \left(\frac{1}{\sqrt{2}}\right)^{m1-1} \sum_{k:even}^{m1} \mathcal{F}\left[|\Psi_{01}^{(m2)}\rangle^{\otimes m1-k} |\Psi_{11}^{(m2)}\rangle^{\otimes k}\right], \quad \text{(EQ. 16b)}$$

$$|\Psi_{10}^{(m1,m2)}\rangle = \left(\frac{1}{\sqrt{2}}\right)^{m1-1} \sum_{k:odd}^{m1} \mathcal{F}\left[|\Psi_{00}^{(m2)}\rangle^{\otimes m1-k} |\Psi_{10}^{(m2)}\rangle^{\otimes k}\right], \quad \text{(EQ. 16c)}$$

$$|\Psi_{11}^{(m1,m2)}\rangle = \left(\frac{1}{\sqrt{2}}\right)^{m1-1} \sum_{k:odd}^{m1} \mathcal{F}\left[|\Psi_{01}^{(m2)}\rangle^{\otimes m1-k} |\Psi_{11}^{(m2)}\rangle^{\otimes k}\right], \quad \text{(EQ. 16d)}$$

where $\mathcal{F}[\cdot]$ takes a tensor product of m1 Bell states and outputs a sum over all permutations involving the m1 tensor factors, and $|\Psi_{ij}^{(m2)}\rangle$ are "block level" Bell states which can be further described by dual-rail Bell states:

$$|\Psi_{00}^{(m2)}\rangle = \left(\frac{1}{\sqrt{2}}\right)^{m2-1} \sum_{k:even}^{m2} \mathcal{F}[|\psi_{00}\rangle_{DR}^{\otimes m2-k} |\psi_{01}\rangle_{DR}^{\otimes m2-k}], \quad \text{(EQ. 17a)}$$

$$|\Psi_{01}^{(m2)}\rangle = \left(\frac{1}{\sqrt{2}}\right)^{m2-1} \sum_{k:odd}^{m2} \mathcal{F}[|\psi_{00}\rangle_{DR}^{\otimes m2-k} |\psi_{01}\rangle_{DR}^{\otimes m2-k}], \quad \text{(EQ. 17b)}$$

$$|\Psi_{10}^{(m2)}\rangle = \left(\frac{1}{\sqrt{2}}\right)^{m2-1} \sum_{k:even}^{m2} \mathcal{F}[|\psi_{00}\rangle_{DR}^{\otimes m2-k} |\psi_{01}\rangle_{DR}^{\otimes m2-k}], \quad \text{(EQ. 17c)}$$

$$|\Psi_{11}^{(m2)}\rangle = \left(\frac{1}{\sqrt{2}}\right)^{m2-1} \sum_{k:odd}^{m2} \mathcal{F}[|\psi_{10}\rangle_{DR}^{\otimes m2-k} |\psi_{11}\rangle_{DR}^{\otimes m2-k}]. \quad \text{(EQ. 17d)}$$

Equations (EQ. 16a)-(EQ. 16d) and (EQ. 17a)-(EQ. 17d) demonstrate that under a QPC(m1, m2) encoding, an E-BSM 150 comprises a plurality of DR-BSMs 170. Under a QPC(m1, m2) each E-BSM 150 can be thought of as a number (m1) of block-level BSMs (denoted "B-BSM"), which in turn each comprise a number (m2) of DR-BSMs.

An E-BSM 150 may be performed in one of several different ways. In some examples, an E-BSM 150 may be "passive", meaning that the type of all DR-BSMs 170 is predetermined and is not changed by the result of a previous DR-BSM 170. With reference to FIG. 1D, under a passive protocol performing an E-BSM 150-1 between a first QPC-encoded qubit 140-1 and a second QPC-encoded qubit 140-2a may comprise performing DR-BSMs 170 between pairs of DR-qubits 160 in parallel with the measurement basis for the DR-BSMs fixed.

For example, to perform a B-BSM encoded as in (EQ. 17), one performs m2 DR-BSMs, e.g. DR-BSM[zz=−1] in parallel—one for each factor of $|\Psi_{kl}\rangle_{DR}$. In the absence of loss, at the block level this protocol will project onto the states $|\Psi_{10}^{(m2)}\rangle$ and $|\Psi_{11}^{(m2)}\rangle$, as well as $|0^{(m2)}\rangle|0^{(m2)}\rangle$ and $|1^{(m2)}\rangle|1^{(m2)}\rangle$, just as the bare dual-rail circuit (FIG. 2B) does. However, in the presence of loss, while the B-BSM can no longer differentiate between $|\Psi_{10}^{(m2)}\rangle$ and $|\Psi_{11}^{(m2)}\rangle$ (that is, it cannot resolve the xx eigenvalues of the block level Bell state), it is still able to distinguish between the block-level Bell states and product states, which amounts to identifying the zz eigenvalue of the block-level Bell state. Accordingly, if one takes the same approach for each of the m1 B-BSMs, then in the absence of loss, this protocol will identify $|\Psi_{10}^{(m1,m2)}\rangle$ and $|\Psi_{11}^{(m1,m2)}\rangle$ with certainty, while with probability $2^{-m1-1}$ it will fail to identify $|\Psi_{00}^{(m1,m2)}\rangle$ and $|\Psi_{01}^{(m1,m2)}\rangle$. In the presence of loss, as long as one B-BSM returns either $|\Psi_{10}^{(m2)}\rangle$ or $|\Psi_{11}^{(m2)}\rangle$ and the remaining B-BSMs return the zz eigenvalues, one can still infer 11 the QPC-encoded Bell state.

In other examples, an E-BSM 150 may be "active", such that a type of one or more DR-BSMs is decided based on the outcome of a previous one or more DR-BSMs. For example, with reference to FIG. 1D, under an active protocol performing an E-BSM 150-1 between a first QPC-encoded qubit 140-1 and a second QPC-encoded qubit 140-2a may comprise performing DR-BSMs 170 between pairs of DR-qubits 160 sequentially and depending on the measurement outcome of a DR-BSM (e.g. 170-2), a type of a subsequent DR-BSM (e.g. 170-3) may be adapted.

As an example of an active protocol for performing an E-BSM, the DR-BSMs may each be one of three types, for example a first type DR-BSM[xx=−1], a second type DR-BSM[zz=+1] and a third type DR-BSM[zz=−1]. More particularly, each B-BSM comprises a number m2 of DR-BSMs. Each B-BSM is performed by performing a first type of DR-BSM (DR-BSM[xx=−1]) on pairs of DR-qubits sequentially until (i) a successful DR-BSM of the first type is performed, (ii) a photon loss is detected, or (iii) the DR-BSM of the first type (DR-BSM[xx=−1]) fails a predetermined number of times in a row. Under condition (i) when the DR-BSM of the first type succeeds, for example by yielding a DR-BSM result of $|\psi_{01}\rangle_{DR}$ or $|\psi_{11}\rangle_{DR}$, then the remaining DR-BSMs of that B-BSM are selected to be either of the second type (DR-BSM[zz=+1]) if the successfully measured dual-rail Bell state is $|\psi_{01}\rangle_{DR}$, or are selected to be of the third type (DR-BSM[zz=−1]) if the successfully measured dual rail Bell state is $|\psi_{11}\rangle_{DR}$. Under condition (ii) or condition (iii), the remainder of the DR-BSMs of that B-BSM are one of the second or third type (selected at random). This protocol has the benefit of boosting the probability of success of each B-BSM, which in turn boosts the probability of success of the E-BSM.

An example of a passive E-BSM protocol for performing a BSM on QPC-encoded states is provided in [Ewert et, al. Phys. Rev. Lett. Vol. 117, 210501 (2016)], hereafter referred to as "Ewert". An example of an active E-BSM protocol for performing a BSM on QPC-encoded states is provided in [S.-W. Lee et al. Phys Rev. A, vol. 100, 052303 (2019)], hereafter referred to as "Lee".

FIG. 3A shows a table of the success probabilities of performing a minimal 4-GHZ measurement (that is an encoded GHZ state measurement on four encoded qubits)

using the QPC-encoded BSM protocol from Ewert. Each E-BSM is encoded in a QPC(m1, m2) encoding, where the considered code sizes (m1, m2) are shown in the first column. It is assumed that each photon partaking in an E-BSM undergoes loss at a rate listed in the first row. The success probabilities far below 0.75 are omitted.

FIG. 3B shows a table of the success probabilities of performing a cyclic 4-GHZ measurement using the QPC-encoded BSM protocol from Ewert. Each E-BSM is encoded in a QPC(m1, m2) encoding, where the considered code sizes (m1, m2) are shown in the first column. It is assumed that each photon partaking in an E-BSM undergoes loss at a rate listed in the first row. The success probabilities far below 0.75 are omitted.

FIG. 4A shows a table of the success probabilities of performing a minimal 4-GHZ measurement using the QPC-encoded BSM protocol from Lee. Each E-BSM is encoded in a QPC(m1, m2) encoding, where the considered code sizes (m1, m2) are shown in the first column. It is assumed that each photon partaking in an E-BSM undergoes loss at a rate listed in the first row. The success probabilities far below 0.75 are omitted.

FIG. 4B shows a table of the success probabilities of performing a cyclic 4-GHZ measurement using the QPC-encoded BSM protocol from Lee. Each E-BSM is encoded in a QPC(m1, m2) encoding, where the considered code sizes (m1, m2) are shown in the first column. It is assumed that each photon partaking in an E-BSM undergoes loss at a rate listed in the first row. The success probabilities far below 0.75 are omitted.

As can be seen from FIGS. 3A, 3B, 4A and 4B, near-deterministic GHZ state measurements that are tolerant of photon loss may be performed.

Figure 5:
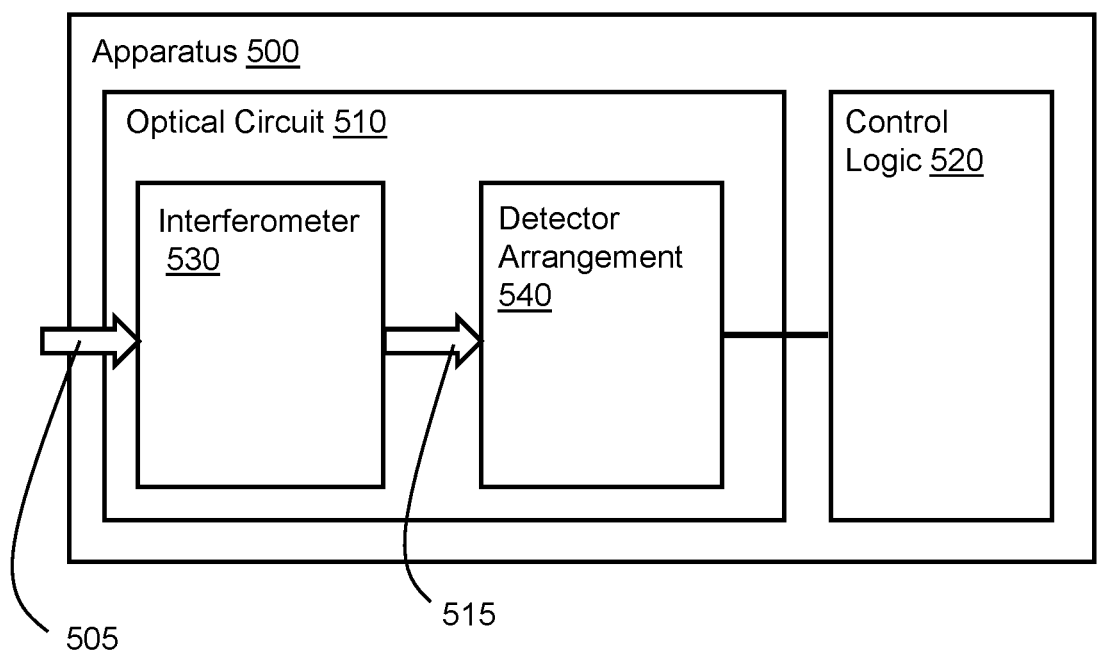
FIG. 5 shows a block diagram of an example apparatus for performing an encoded n-qubit GHZ state measurement.

FIG. 5 illustrates a block diagram of an apparatus 500 for performing an encoded n-qubit GHZ state measurement on n encoded qubits. The apparatus comprises a linear optical circuit 510 and control logic 520. The linear optical circuit 510 comprises linear optical elements such as beamsplitters, phase shifters, and photodetectors. Accordingly, the linear optical circuit 510 comprises an interferometer 530 and a detector arrangement 540.

The interferometer 530 may be designed and manufactured in any suitable and desired way e.g, depending on the modes of the electromagnetic radiation to be transformed by the interferometer 530). Thus, for example, when the electromagnetic radiation has an optical or infrared wavelength (e.g, between 400 nm and 700 nm or between 700 nm and 1600 nm), the optical paths through the interferometer 530 may be implemented at least partially using optical fibres. In some examples, the interferometer 530 may be implemented in bulk optics. However, in some examples, the interferometer 530 may comprise (that is, is designed and manufactured using) an integrated circuit. In the photonic integrated circuit, the optical paths may be implemented with, for example, a plurality of etched waveguides and plurality of coupling locations arranged in the photonic integrated circuit. At each coupling location, active optical elements may be arranged (e.g. EOM phase shifters) that are configured to control the coupling interaction between the waveguides. The integrated circuit may be implemented in silicon nitride (Si3N4) or any other suitable material (such as thin-film lithium niobate).

The interferometer 530 is arranged to receive, as a plurality of input optical modes 505, a number n of encoded qubits. Each encoded qubit 130 comprises a first Calderbank-Shor-Steane-encoded (CSS-encoded) qubit 140. At least (n−2) of the encoded qubits 130 further comprise a second CSS-encoded qubit 140, the first and second CSS-encoded qubits together comprising a repetition-encoded qubit. Each CSS-encoded qubit 140 comprises a plurality of dual-rail encoded photonic qubits 160, each dual-rail encoded photonic qubit encoded as probability amplitudes corresponding to the photon occupation of two orthogonal optical modes.

The interferometer 530 is further configured to interfere the encoded qubits 130. Interfering the encoded qubits 130 comprises interfering a CSS-encoded qubit 140 of the jth encoded qubit with a CSS-encoded qubit 140 of the (j+1)th encoded qubit for all j between 1 and n−1. Interfering a first CSS-encoded qubit with a second CSS-encoded qubit comprises interfering the optical modes of each dual-rail encoded photonic qubit 160 of the first CSS-encoded qubit with the optical modes of a corresponding dual-rail encoded photonic qubit 160 of the second CSS-encoded qubit.

The interferometer 530 is further configured to output the interfered encoded qubits 130 as a plurality of output optical modes 515 towards the detector arrangement 540.

The detector arrangement 540 comprises a plurality of photodetectors configured to measure the photon occupation of each of the output optical modes 515. In some examples, the photodetectors may comprise photon number resolving (PNR) detectors, capable of determining how many photons are received. For example, the PNR photodetectors may comprise superconducting nanowire detectors that are configured to generate an output signal intensity proportional to the (discrete) number of photons that strike a detector. For example, the PNR photodetectors may comprise transition edge sensors (TESs). In some examples, the photodetectors may comprise threshold detectors, also known as on/off detectors. Threshold detectors are capable of determining the presence/absence of photons in an output mode. For example, the threshold detectors may comprise avalanche photodiodes. In some examples, the photodetectors may comprise pseudo-threshold detectors, capable of determining if zero, one, or more than one photon is received. The choice of detector may depend on the form factor of the apparatus 500.

The control logic 520 may be implemented in a hardware controller. In some examples, the controller may be a general or dedicated processor, such as a central processing unit (CPU) or a graphic processing unit (GPU). In other examples, the controller may be implemented in a dedicated, application-specific integrated circuit (ASIC) or an application-specific standard product (ASSP) or another domain-specific architecture (DSA). Alternatively, the controller may be implemented in adaptive computing hardware (that is, hardware comprising configurable hardware blocks or configurable logic blocks) that has been configured to perform the required functions, for example in a configured field programmable gate array (FPGA).

The control logic 520 is coupled to the detector arrangement 540. The control logic is configured to receive one or more indications from the detector arrangement 540) as to whether a DR-BSM 170 has been successfully performed on each interfered pair of dual-rail encoded photonic qubits 160. The control logic 520 is further configured to determine, from the one or more indications, that an encoded n-qubit GHZ state measurement has been performed on the n encoded qubits. In particular, an indication from the detector arrangement 540) that DR-BSMs 170 have been performed on interfered pairs of DR-qubits may imply that a E-BSM 150 has been successfully performed on each pair of CSS-encoded qubits, which in turn may imply that the encoded n-qubit GHZ state measurement 120 has been performed on the n encoded qubits.

In some examples, the interferometer 530 may comprise one or more active optical elements to selectively control the interference between the optical modes of a first DR-qubit and a second DR-qubit. The control logic 520 may be coupled to the interferometer 530. The control logic 520) may be configured to generate one or more control signals to configure the one or more active optical elements to influence a type of Bell measurement that is performed on the interfered first and second DR-qubits. For example, the control logic 520 may be configured to, based on one or more indications from the detector arrangement 540 of the outcomes of DR-BSMs of a first type, reconfigure the interferometer 530 such that a subsequent DR-BSM is of a second type. In this way, the apparatus may be used to perform n-qubit GHZ state measurements by performing active E-BSMs.

Figure 6A:
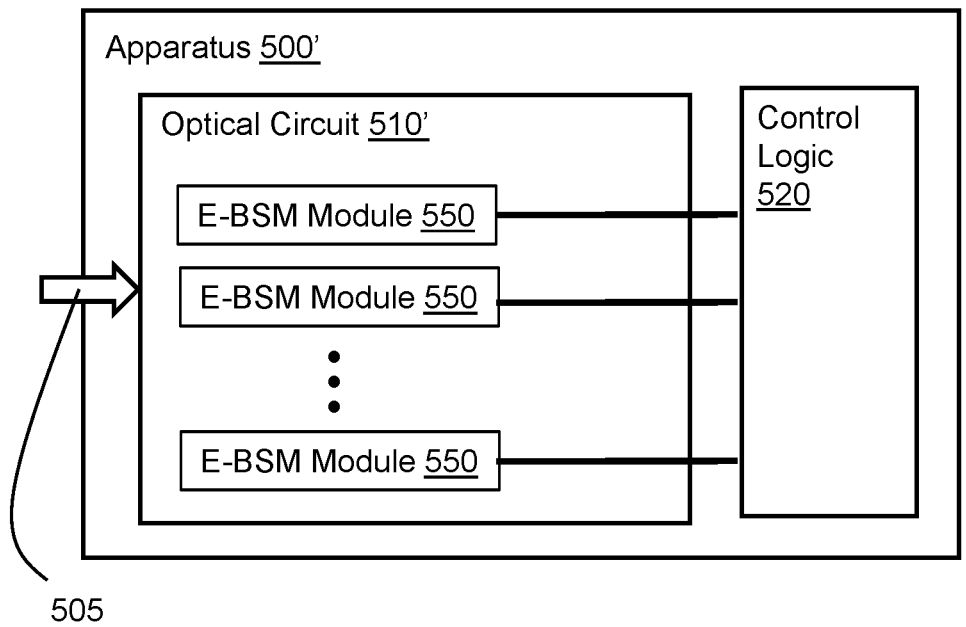
FIG. 6A shows a block diagram of an example apparatus for performing an encoded n-qubit GHZ state measurement.

In some examples the linear optical circuit of the measurement apparatus may be arranged to provide a plurality of E-BSM modules. An example is shown in FIG. 6A, which depicts an apparatus 500' for performing an encoded n-qubit GHZ state measurement on n encoded qubits. The apparatus 500' comprises an optical circuit 510' (comprising an interferometer and detector arrangement) and control logic 520. The optical circuit 510' is arranged to provide a plurality of E-BSM modules 550. Each E-BSM module 550 is configured to perform an E-BSM 150 on two CSS-encoded qubits 140. In other words, the interferometer 530) and detector arrangement 540 may be arranged to define specific regions or portions of the apparatus 500' that are configured to receive, as a plurality of input optical modes 505, two CSS-encoded qubits 140, and perform a E-BSM on those two received CSS-encoded qubits 140.

Figure 6B:
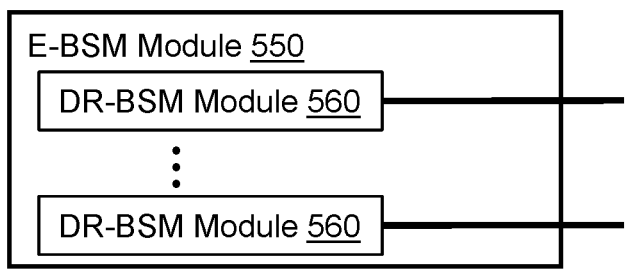
FIG. 6B shows a block diagram of an example E-BSM module.

As depicted in FIG. 6B, each E-BSM module 550 comprises a plurality of DR-BSM modules 560. Each DR-BSM module 560 is configured to receive, as a plurality of optical modes 505, two DR-qubits 160 and perform a DR-BSM 170 on those two received DR-qubits 160. The control logic 520 may be configured to control a type of DR-BSM 170 performed by a first DR module 560 based on the success or failure of one or more DR-BSMs performed by a corresponding one or more DR-BSM modules 560) of the same E-BSM module 550. In some examples, the control logic may determine a type of DR-BSM to be performed by generating control signals to route input modes to selected DR-BSM modules configured to perform a predetermined type of DR-BSM. In other examples, the DR-BSM modules 560 may comprise reconfigurable elements (e.g. Mach Zehnder interferometers) such that, in response to a control signal generated by the control logic 520, the DR-BSM modules 560 are reconfigured to perform a DR-BSM of a desired type.

Figure 7:
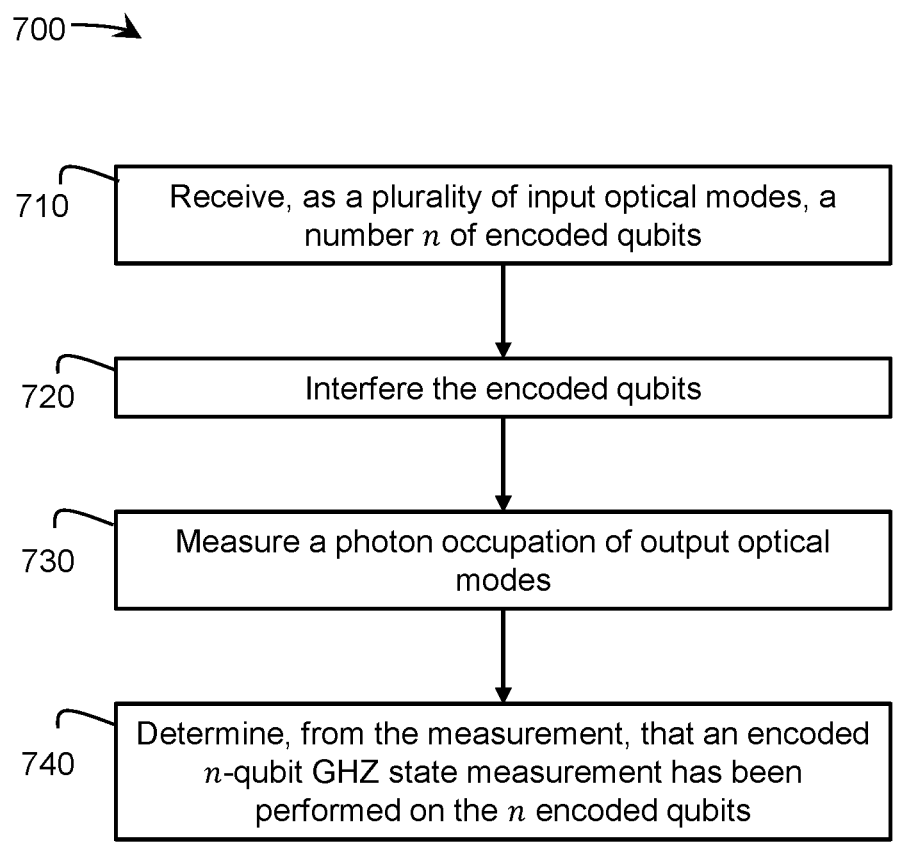
FIG. 7 shows a flowchart of an example method for performing an encoded n-qubit GHZ state measurement.

FIG. 7 shows a flowchart of a method 700 for performing an encoded n-qubit GHZ measurement 120 on n encoded qubits.

At 710, the method comprises receiving, as a plurality of input optical modes 505, a number n of encoded qubits 130. Each encoded qubit 130 comprises a Calderbank-Shor-Steane-encoded qubit (CSS-encoded qubit) 140. At least (n−2) of the encoded qubits further comprise a second CSS-encoded qubit 140, the first and second CSS-encoded qubits together comprising a repetition-encoded qubit.

At 720, the method comprises interfering, in an interferometer 530, the encoded qubits 130 and outputting the interfered encoded qubits as a plurality of output optical modes 515 to a detector arrangement 540) comprising a plurality of photon detectors.

Interfering the encoded qubits 130 comprises interfering a CSS-encoded qubit of the jth encoded qubit with a CSS-encoded qubit of the (j+1)th encoded qubit, for all j between 1 and n−1. For example, with reference to FIG. 1C, the optical modes that define the CSS-encoded qubit 140-1 are interfered with the optical modes of the CSS-encoded qubit 140-2a, the optical modes that define the CSS-encoded qubit 140-2b are interfered with the optical modes of the CSS-encoded qubit 140-3a, and the optical modes that define the CSS-encoded qubit 140-3b are interfered with the optical modes of the CSS-encoded qubit 140-4.

Interfering a first CSS-encoded qubit with a second CSS-encoded qubit comprises interfering the optical modes of each DR-qubit of the first CSS-encoded qubit with the optical modes of a corresponding DR-qubit of the second CSS-encoded qubit. For example, with reference to FIG. 1D, the optical modes that define the DR-qubit 160-1 are interfered with the optical modes of the DR-qubit 160-5, the optical modes that define the DR-qubit 160-2 are interfered with the optical modes of the DR-qubit 160-6, the optical modes that define the DR-qubit 160-3 are interfered with the optical modes of the DR-qubit 160-7, and the optical modes that define the DR-qubit 160-4 are interfered with the optical modes of the DR-qubit 160-8.

At 730, the method comprises measuring, by the detector arrangement 540, a photon occupation of each of the output optical modes.

At 740, the method comprises determining, from the measurement at 730, that an encoded n-qubit GHZ measurement has been performed on the n encoded qubits. Determining that an encoded n-qubit GHZ state measurement has been performed on the n encoded qubits comprises receiving an indication from the detector arrangement 540) as to whether a DR-BSM 170 has been performed on each interfered pair of DR-qubits. Determining that an encoded n-qubit GHZ measurement 120 has been performed on the n encoded qubits further comprises determining, from the indication, that an encoded n-qubit GHZ measurement has been performed on the n encoded qubits 130.

Figure 8A:
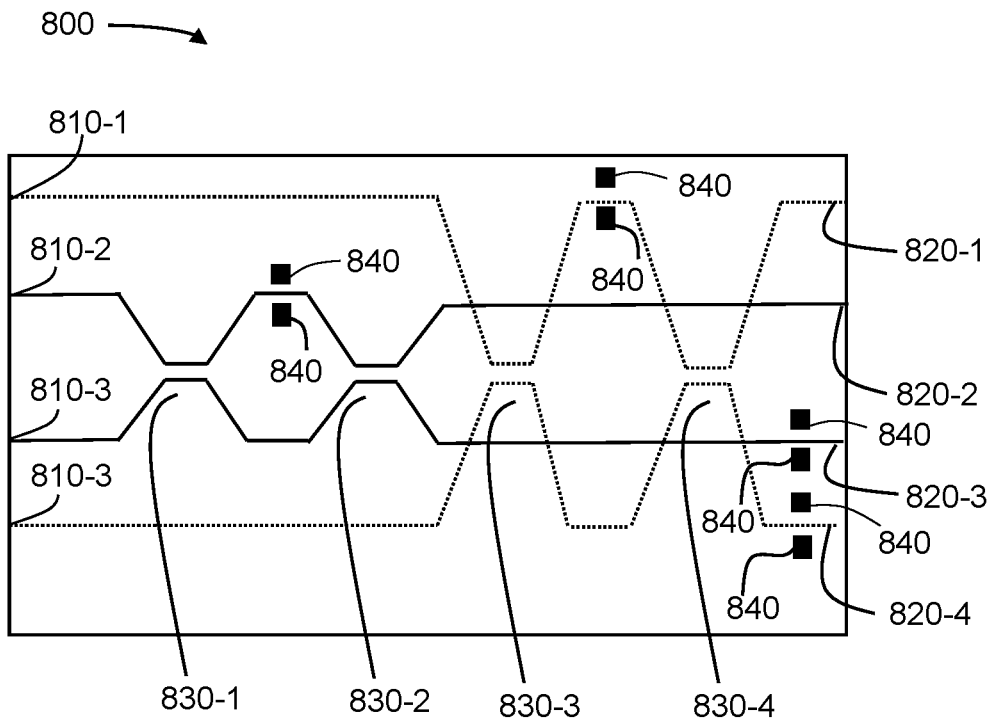
FIG. 8A shows an illustration of an example spatial-rail encoded interferometer for use in performing a DR-BSM.
Figure 8B:
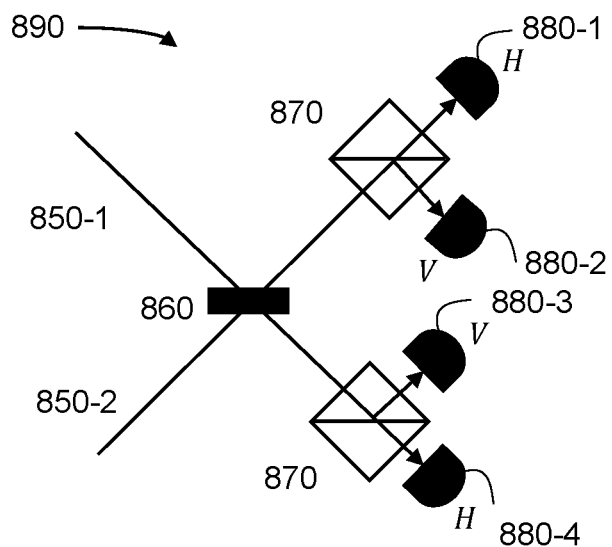
FIG. 8B shows an illustration of an example DR-BSM for use with polarisation-encoded modes.

FIGS. 8A and 8B depict example implementations of DR-BSM modules 560 (or portions thereof).

FIG. 8A illustrates a portion of a photonic integrated circuit 800 for implementing the beamsplitter interactions of the dual-rail linear optical circuit illustrated in FIG. 2A. In particular, the photonic integrated circuit 800 receives DR-qubits encoded in spatial modes. The state of a first DR-qubit is encoded in the presence or absence of photons provided to input ports 810-1 and 810-2, and the state of a second DR-qubit is encoded in the presence or absence of photons provided to ports 810-3 and 810-4. The integrated circuit 800 of FIG. 8A may be implemented using, for example, thin-film lithium niobate or silicon nitride. Waveguides are etched or otherwise formed on a substrate such as silicon nitride or thin-film lithium niobate to provide optical paths through the integrated circuit from the input ports 810 to the output ports 820. Solid and dotted lines indicate waveguides at different depths within the integrated circuit—crossing points between solid and dotted lines in the diagram do not represent interactions between the optical modes of the respective waveguides. The output modes exit the portion of the photonic integrated circuit 800 at outputs 820-1 to 820-4 and are provided to photodetectors (not shown in the figure).

As depicted in FIG. 8A, a beamsplitter interaction (see 204 of FIG. 2A) between the second mode of the first DR-qubit and the first mode of the second DR-qubit is performed using first and second directional couplings (830-1 and 830-2), in each of which in a small coupling region two waveguides are situated close enough to one another that the evanescent fields between the two waveguides couple, the length of the coupling region and the separation of the waveguides selected in manufacture to provide a desired coupling coefficient. In particular, the first and second directional couplings 830-1, 830-2 are manufactured to provide a 50/50 beamsplitter interaction between the optical modes in the second and third waveguides. When a suitable waveguide substrate is used, such as lithium niobate which has a second-order nonlinear optical susceptibility ($\chi(2)$), electric fields can be used to impart phase shifts. A first pair of electrodes 840 is arranged between the waveguide coupling regions 810-1 and 810-2 to provide, in response to a control signal (not shown), an electric field across a portion of a waveguide in order to impart a phase shift on electromagnetic radiation passing therethrough. A second pair of electrodes 840 is arranged after the second waveguide coupler 810-2 (close to output port 820-3 in the figure) to provide, in response to a second control field, an electric field across a portion of a waveguide in order to impart a phase shift on electromagnetic radiation passing therethrough. By tuning the electric fields imparted by the electrode pairs, one can tune the effective transmission coefficient of the reconfigurable beamsplitter transformation imparted on the second mode of the first DR-qubit and the first mode of the second DR-qubit. Accordingly, the first and second directional couplings (830-1 and 830-2) and the relevant electrode pairs act like a Mach-Zehnder interferometer that can be tuned to provide a 50/50 beamsplitter interaction. Advantageously, by providing a reconfigurable beamsplitter that can be tuned to impart a 50/50 beamsplitter interaction instead of a single directional coupling designed to impart a 50/50 beamsplitter interaction, errors caused by inherent manufacturing inaccuracies in etching the directional couplings can be corrected for. In a similar manner, a beamsplitter interaction is performed on the first mode of the first DR-qubit and the second mode of the second DR-qubit using two directional waveguide couplers 830-3 and 830-4 and a plurality of electrodes 840).

The photonic integrated circuit 800 of FIG. 8A is configured to implement one type of DR-BSM. The skilled person will appreciate that other photonic integrated circuit designs may be used to implement different types of DR-BSMs. Furthermore, a photonic integrated circuit may comprise further tuneable elements such that, by using suitable control signals, different types of DR-BSM may be implemented.

FIG. 8B depicts example apparatus 890 for implementing a DR-BSM when DR-qubits are encoded as polarisation modes. In particular, a first DR-qubit 850-1 and a second DR-qubit are provided to a 50/50 beamsplitter 860. A computational 0 state is encoded as a horizontally polarised photon H, while a computational 1 state is encoded as a vertically polarised photon V. The outputs from the 50/50 beamsplitter 860 are provided to polarised beamsplitters 870, which transmit or reflect received photons based on the polarisation of those received photons. Photodetectors 880-1 to 880-4 are arranged to detect photons output from the polarised beam splitters 870. The outputs from the detectors 880 indicate whether the DR-BSM was successful. The skilled person will appreciate that apparatus 890 is configured to perform one type of DR-BSM. By adapting the apparatus, for example with the addition of waveplates, different DR-BSMs may be implemented. The skilled person would appreciate that active optical elements may be provided such that a control signal may be used to control which type of DR-BSM is performed.

Fault Tolerant Quantum Computation

Figure 9:
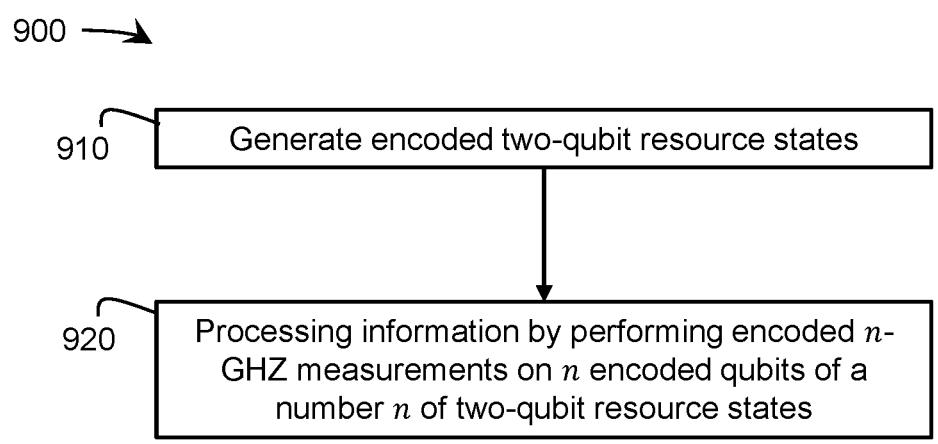
FIG. 9 shows a flowchart of an example method for fault-tolerant measurement-based quantum computation.
Figure 10:
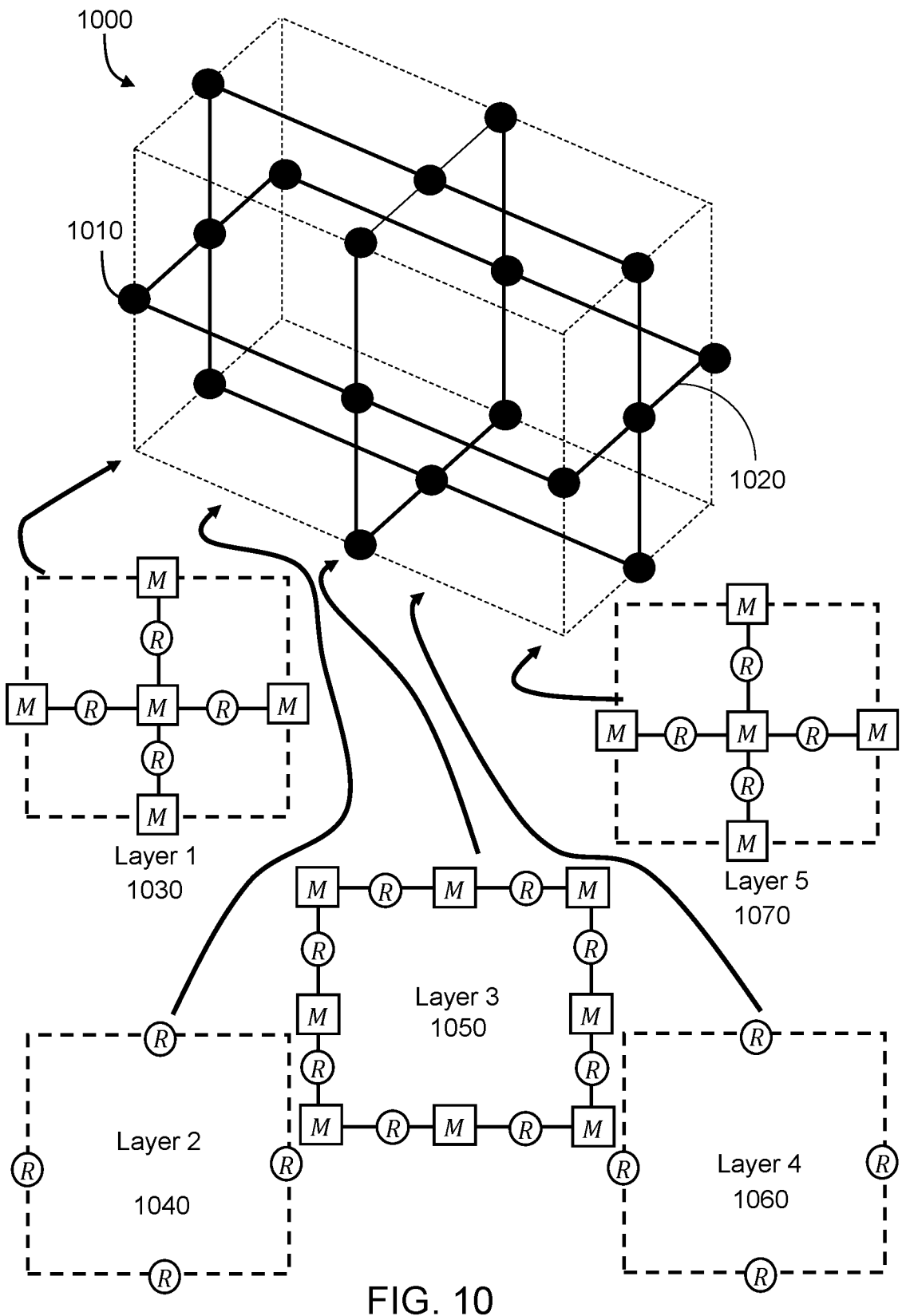
FIG. 10 shows an illustration of an example unit cell of an RHG computational lattice and an example indication as to how the method of FIG. 9 applies to that unit cell.

FIG. 9 shows a flowchart of a method 900 for fault-tolerant measurement-based quantum computation using an implementation of an error correction code representable by a computational lattice comprising a plurality of vertices and a plurality of edges. For example, the lattice may comprise a Raussendorf-Harrington-Goyal (RHG) lattice representing the fault-tolerant measurement-based quantum computation of the surface code. FIG. 10 shows an illustration of a unit cell 1000 of a RHG lattice, comprising a plurality of lattice vertices 1010 and a plurality of lattice edges 1020.

At 910, the method comprises generating, for edges of the lattice, encoded two-qubit resource states 110. Each encoded qubit 130 of an encoded two-qubit resource state 110 comprises at least one CSS-encoded qubit 140 and each CSS-encoded qubit 140 comprises a plurality of dual-rail encoded photonic qubits 160. In some examples each CSS-encoded qubit may comprise a QPC-encoded qubit. The two-qubit resource states 110 may be graph states represented as $$\left(\frac{1}{\sqrt{2}}\right)(|0+\rangle+|1-\rangle)$$

which is equivalent to a Bell state up to a Hadamard gate.

At 920, the method comprises processing information by performing, for vertices of the lattice, encoded n-GHZ measurements on n encoded qubits of a number n of two-qubit resource states, wherein n is the degree of the vertex.

In some examples, the performed n-qubit GHZ state measurements are all of a first type, for example minimal n-GHZ measurements. In some examples, the performed n-qubit GHZ state measurements are all of a second type, for example cyclic n-GHZ measurements. In some examples, the performed n-qubit GHZ state measurements are of a mixture of types, for example some n-qubit GHZ state measurements may be of a first type and some n-qubit GHZ state measurements may be of a second type.

The number of photons used to produce each resource state may depend on the lattice structure or the types of n-GHZ measurements to be used to process the quantum information or the number n of logical qubits measured by each measurement or the choice of CSS-encoding. Furthermore, the two encoded qubits of each two-qubit resource state may in some examples be formed from different numbers of photons.

The Raussendorf-Harrington-Goyal (RHG) lattice is a cluster state that supports fault-tolerant measurement-based quantum computation. Conventionally, measurement-based quantum computation in linear optics using an RHG lattice requires a number of distinct steps: firstly, for each lattice vertex 1010, a so-called star state, i.e.

$$\left(\frac{1}{\sqrt{2}}\right)(|0+00+\rangle+|1-11-\rangle),$$

or its local Clifford-equivalent is constructed: secondly, BSMs (or a local Clifford-equivalent measurement) are performed on neighbouring pairs of star states to create the lattice edges 1020 and the remaining qubit of each star state becomes a "lattice qubit" located at the lattice vertex 1010;

and thirdly, a sequence of measurements is performed on the lattice qubits to process the quantum information. This conventional approach may be referred to as a "vertex-centric" approach to processing quantum information using the RHG lattice. There are several reasons why this conventional approach is difficult to implement in linear optics. As one example, the resource states (e.g, star states) require many photons and may be difficult to generate. As another example, the requirement that the lattice be built and then subsequently measured means that several layers of the lattice must contemporaneously exist, which means that the photonic star states need to persist for long enough to both create and measure the lattice, which in turn requires extra time delay equipment, such as potentially lossy delay lines. Furthermore, it is difficult to identify photon loss that occurs in the time between the creation of the star states and the measurement of the lattice qubits, which can mean that unidentifiable errors creep into computations.

In contrast to the vertex-centric approach, the method 900 presented above in relation to FIG. 9 may be considered as an edge-centric approach to processing quantum information with a computational lattice. The edge-centric approach is dual to the conventional vertex-centric approach. As described above, for edges 1020 of the RHG lattice, corresponding encoded two-qubit resource states are generated. Encoded n-qubit GHZ measurements are then performed on n logical qubits of n resource states. Accordingly, step 910 leads to the generation of a plurality of disconnected lattice edges 1020 and step 920 can be thought of as simultaneously linking the edges to create a lattice qubit and measuring that lattice qubit in the X basis.

This edge-centric approach is illustrated in FIG. 10. Under the edge-centric approach, the unit cell 1000 of the RHG lattice can be thought of as five layers 1030, 1040, 1050, 1060, 1070. In the depicted five layers, a resource state 110 comprising a two-qubit graph state is denoted by a solid line with an "R", and a GHZ measurement 120 is denoted by an "M". For each edge 1020 of the lattice, a resource state 110 is generated. For each vertex 1010 of the lattice, a suitably sized GHZ measurement 1020 is performed. Layers 1 (1030), 3 (1050) and 5 (1070) align with the layers of vertices 1010 of the lattice, while layers 2 (1040) and 4 (1060) comprise resource states 110 that are consumed by the measurements 120 of the preceding and subsequent layers.

In order to achieve fault-tolerance one may need to be able to handle failed n-qubit GHZ state measurements. There are several techniques for achieving this using additional classical computing resources such as a decoder. For example, all measurement outcomes may be recorded and used to produce error syndrome information. Producing error syndrome information may comprise, for example, constructing an error syndrome graph. By analysing the error syndrome information, for example by analysing the structure of the error syndrome graph, the classical computing resources may determine the type and location of the errors in the quantum system, which enables the use of error correction protocols to recover the quantum information.

The edge-centric approach to fault-tolerant quantum computation described herein provides a number of advantages over the conventional vertex-centric approach. As an example, the resource states are simpler to generate than those of the conventional vertex-centric approach. As another example, as the encoded n-qubit GHZ measurements extract the required eigenvalue information (that is, can be thought of as simultaneously creating and measuring a lattice qubit), the resource states do not need to persist for as long as in the conventional vertex-centric approach, which means there is less opportunity for photon loss between creation of the resource states and measurement.

Figure 11:
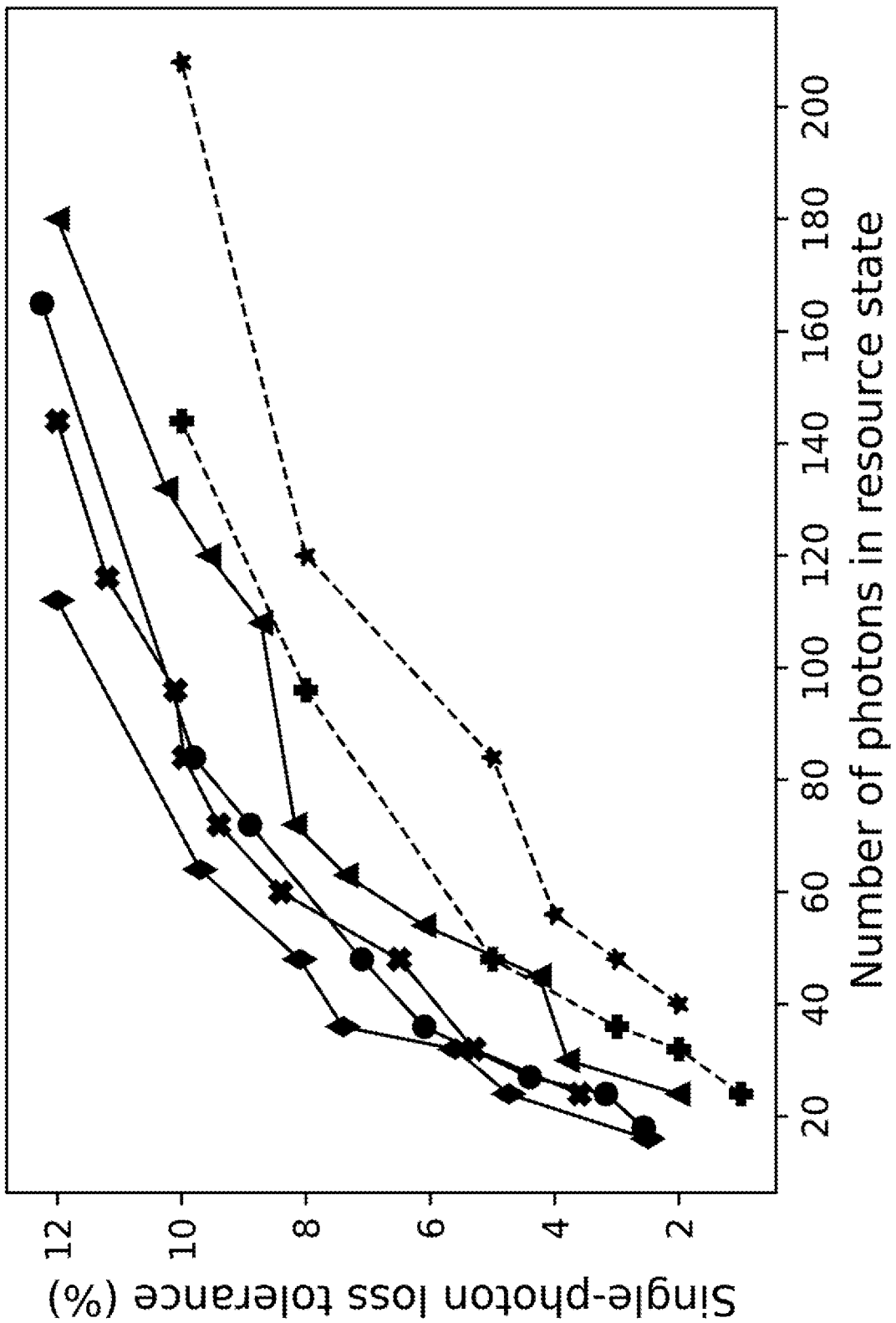
FIG. 11 shows an example graph of single-photon loss tolerance against the number of photons per resource state for both edge-centric and vertex-centric approaches to measurement-based quantum computation using an RHG lattice, and for which CSS-encoded qubits are QPC-encoded qubits.

The edge-centric approach can also provide a better single-photon loss tolerance per number of resource state photons than a vertex-centric approach. FIG. 11 shows a plot of single-photon loss tolerance against number of photons per resource state for edge-centric quantum computations (solid lines) and vertex-centric quantum computations (dashed lines) with an RHG lattice. In FIG. 11, the CSS-encoded qubits are QPC-encoded qubits.

The vertex-centric values (dashed lines) were calculated by (i) considering, for a given QPC(m1, m2) encoding that is capable of beating the edge-loss thresholds for the RHG lattice, the basic resource states to be star states having four QPC-encoded qubits, (ii) assuming that the lattice qubit of each resource state has been measured away, and (iii) considering lattice edges to be formed via E-BSMs. This procedure was taken to provide a fair comparison between the vertex-centric and edge-centric approaches. The dashed line with star-shaped icons corresponds to the case in which E-BSMs are passive. The dashed line with plus-shaped icons corresponds to the case in which E-BSMs are active.

The solid line with triangle icons indicates results for a computation for which all n-qubit GHZ measurements are minimal n-GHZ measurements and all E-BSMs are passive E-BSMs. The solid line with cross icons indicates results for a computation for which all n-qubit GHZ measurements are cyclic n-GHZ measurements and all E-BSMs are passive E-BSMs. The solid line with circle icons indicates results for a computation for which all n-qubit GHZ measurements are minimal n-GHZ measurements and all E-BSMs are active E-BSMs. The solid line with diamond icons indicates results for a computation for which all n-qubit GHZ measurements are cyclic n-GHZ measurements and all E-BSMs are active E-BSMs. For the cyclic n-GHZ measurement results (cross icons and diamond icons), Hadamard-rotated QPC encodings were used.

The number of photons used per resource state when minimal n-GHZ measurements are used scales with the QPC encoding as $(3 \times m1 \times m2)$. For example, using a QPC(2,4) encoding (24 photons per resource state on average) and minimal n-GHZ measurements with an active E-BSM protocol, the computation has a single-photon loss tolerance of approximately 3.1% (circle icon). The number of photons used per resource state when cyclic n-GHZ measurements scales with the QPC encoding as $(4 \times m1 \times m2)$. Using a 24-photon resource state and cyclic n-GHZ measurements with an active E-BSM protocol, the computation has a single-photon loss tolerance of approximately 4.7% (diamond icon). Accordingly, the single-photon loss tolerances of the edge-centric approaches are greater than the best-known vertex-centric approach which has a single-photon loss tolerance of approximately 2.7% when 24-photon resource states are used.

The methods described above can be extended beyond the RHG lattice to a broad class of fault-tolerant cluster states, including those that can be described as foliations of CSS codes and those that cannot be realized as foliated quantum codes.

Figure 12:
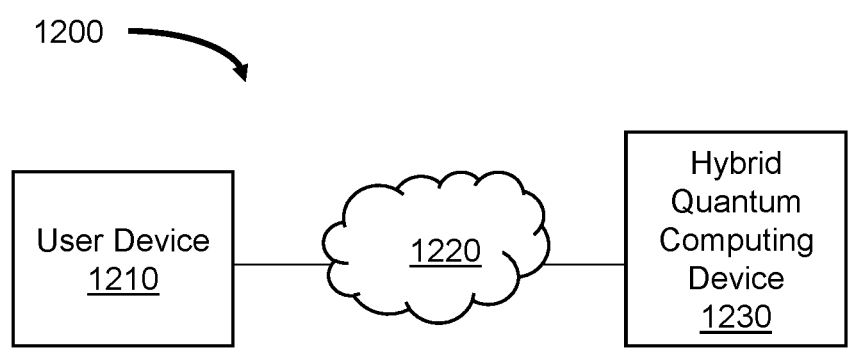
FIG. 12 shows a block diagram of a hybrid quantum computing system in accordance with one or more embodiments.

FIG. 12 shows a block diagram of a hybrid computing system 1200 according to one or more embodiments. The hybrid computing system 1200 comprises a user device 1210, a network 1220 and a hybrid quantum computing subsystem 1230 for measurement-based quantum computation. Other architectures to that shown in FIG. 12 may be used, as would be appreciated by the skilled person.

The user device 1210 and hybrid quantum computing subsystem 1230 are configured to communicate with each other over the network 1220. The network 1220 may be any known type of computer network enabling wired or wireless communication between user device 1210 and the hybrid quantum computing subsystem 1230. For example, the network 1220 may comprise a Local Area Network (LAN), a Wide Area Network (WAN) or the Internet.

The user device 1210 may be any type of user device. For example, the user device 1210 may comprise a computing device, a server, a tablet computer, a portable computer or so on. In some examples, the user device 1210 may provide a user interface through which a user can interact with the hybrid quantum computing subsystem 1230. For example, the user device 1210 may be configured to run software to present a user interface, for example a graphical user interface, through which the user can submit commands to and receive responses from the hybrid quantum computing subsystem 1230. The hybrid quantum computing subsystem 1230 comprises one or more classical computing apparatuses and one or more quantum computing apparatuses. The classical computing apparatus is configured to receive commands from the user device 1210, to control the operation of the quantum computing apparatus in response to those commands, and to provide a response to the user device 1210 based on the output from the quantum computing apparatus. For example, the classical computing apparatus may receive a quantum algorithm from the user device 1210, compile that quantum algorithm into machine level control signals for operating the quantum computing apparatus, receive as output a solution to the quantum algorithm, and provide that solution to the user device 1210.

Figure 13:
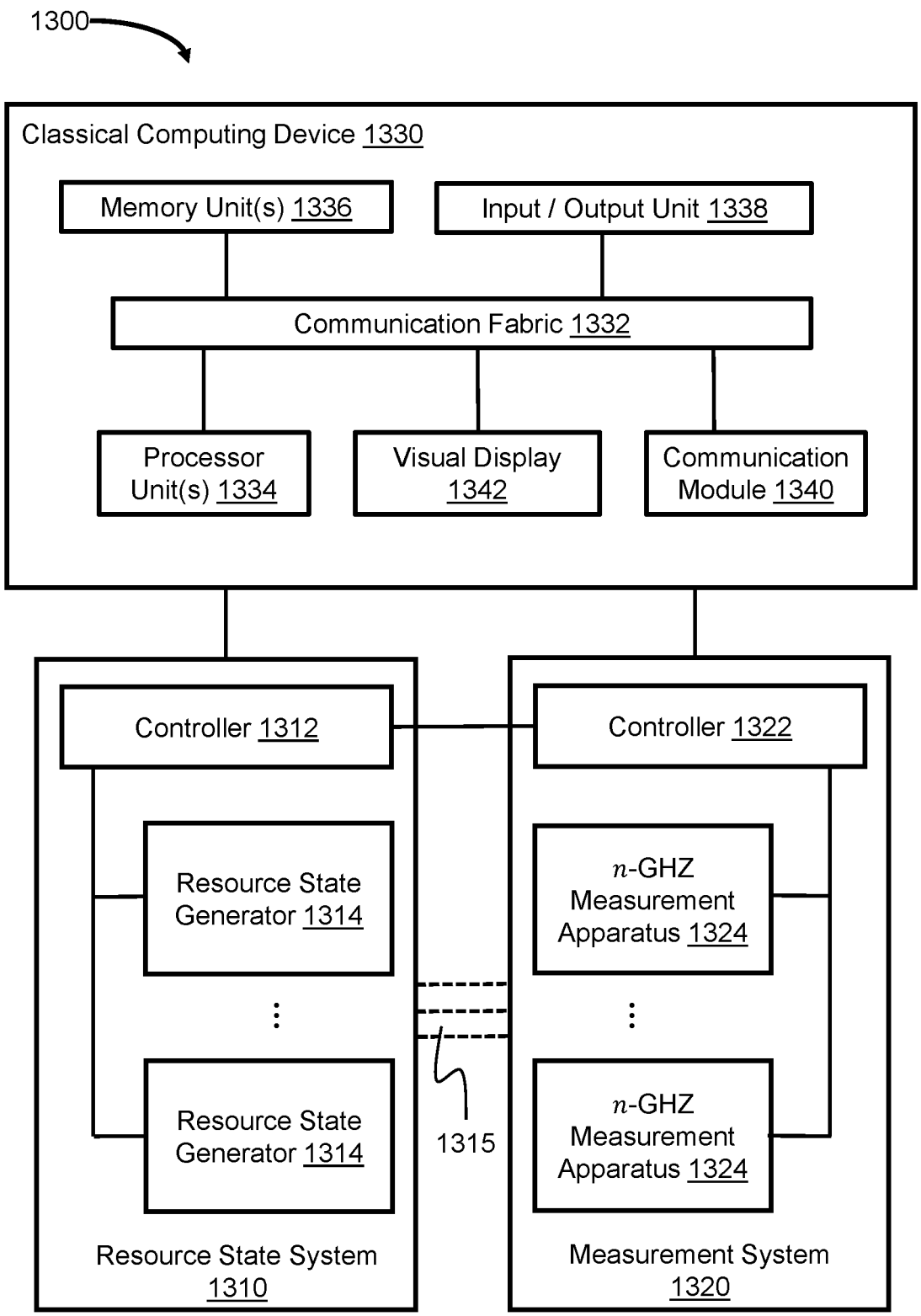
FIG. 13 shows a block diagram of a hybrid quantum computing system in accordance with one or more embodiments.

FIG. 13 shows a block diagram of a hybrid quantum computing system 1300 in accordance with some embodiments. The system 1300 may for example act as the hybrid quantum computing subsystem 1230 described above in relation to FIG. 12. The skilled person would appreciate that the architecture described in relation to FIG. 13 is not intended to provide limitations on the classical or quantum computing devices with which the methods described herein may be implemented. Instead, the skilled person would appreciate that other architectures may be applied.

The hybrid quantum computing system 1300 comprises a resource state system 1310, a measurement system 1320, and a classical computing apparatus 1330.

The resource state system 1310 comprises a controller 1312 and a number of resource state generators 1314. When instructed by the classical computing apparatus 1330, the controller 1312 may cause the resource state generators 1314 to generate resource states. The resource states are, up to local Clifford operations, two-qubit graph states comprising two encoded qubits comprising a plurality of photons. The two encoded qubits of each resource state may comprise the same number of photons or different number of photons. For example, in some resource states one encoded qubit may comprise a first CSS-encoded qubit and the other encoded qubit may comprise a repetition-encoded qubit comprised of first and second CSS-encoded qubits. In some resource states, both encoded qubits may be repetition-encoded qubits. Each CSS-encoded qubit comprises a plurality of DR-qubits, each DR-qubit encoded as probability amplitudes corresponding to the photon occupation of two orthogonal optical modes.

Each resource state generator 1314 comprises a plurality of single photon sources configured to generate photons. Each resource state generator 1314 further comprises a linear optical circuit configured to receive the generated photons and probabilistically produce encoded two-qubit graph states. The linear optical circuit may comprise, for example, an interferometer and a plurality of photodetectors. For example, the linear optical circuit may include waveguides, beamsplitters, phase shifters, delay lines, photodetectors or similar.

Figure 14:
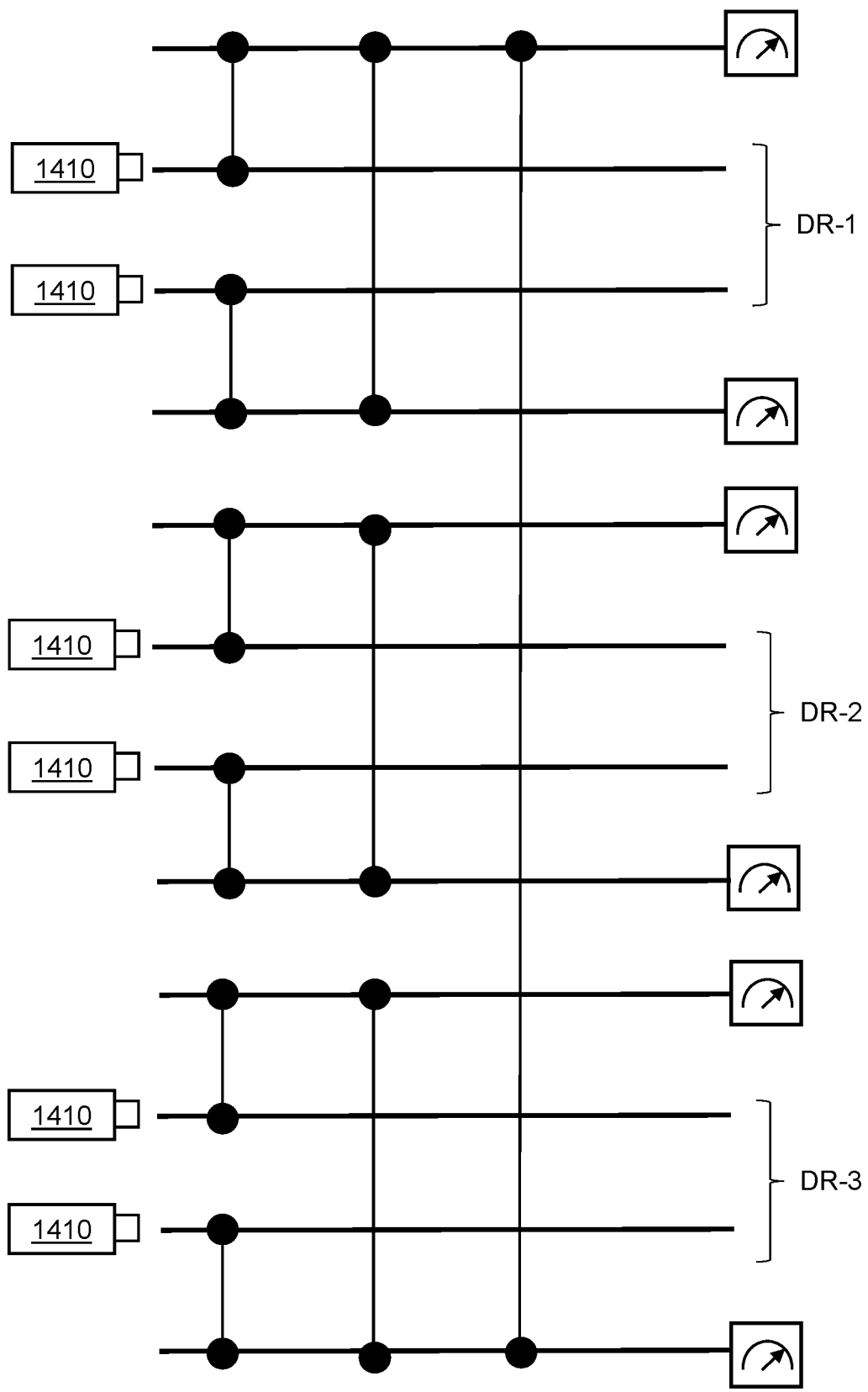
FIG. 14 shows an example linear optical circuit diagram for generating a 3-GHZ state, from which a CSS-encoded resource state can be generated.

The resource state generators 1314 may generate the encoded two-qubit resource states may be formed in any of a number of ways. For example, the resource state generators 1314 may be configured to generate a plurality of 3-GHZ states, and then to perform further entangling operations (through the use of linear optical components such as photodetectors and beamsplitters) to build the encoded two-qubit resource states. A diagram of an example linear optical circuit for generating a 3-GHZ state is shown in FIG. 14. Single photons are provided to particular input modes of the linear optical circuit (as indicated by the single photon source icon 1410). A dual-rail encoded 3-GHZ state may be probabilistically generated (qubits DR-1. DR-2 and DR-3) if the performed measurements give the correct predetermined result. Further probabilistic operations may then be performed to entangle qubits of several 3-GHZ states to produce intermediate states which may then be further entangled to produce an encoded resource state. The skilled person would appreciate that DR-qubits may be encoded in spatial or polarisation modes, or that other methods for building the resource states may be utilised.

Resource states are provided over a quantum channel 1315 to the measurement system 1320. Measurement system 1320 comprises a controller 1322 and a plurality of measurement apparatus modules 1324 configured to perform encoded n-qubit GHZ state measurements. The measurement modules 1324 may be as described elsewhere herein. In some examples, measurement modules 1324 may be configured to perform an encoded n-qubit GHZ state measurement of a fixed type. In some examples, measurement modules 1324 may be reconfigurable and capable of performing different types of GHZ state measurement in response to control signals from the controller 1322.

The controllers 1312 and 1322 are configured to communicate with each other to coordinate the speed of generation of resource states. In some example, the controllers 1312 and 1322 may comprise a single controller. The controllers 1312, 1322 may be implemented using any number of classical computing components such as CPUs, GPUs, memory (RAM, ROM), hard coded logic components, ASICs, microcontrollers, or programmable logic such as FPGAS.

The measurement system 1320 is configured to receive a plurality of resource states 110 from the resource state system 1310 and to process information by performing encoded n-qubit GHZ state measurements on encoded qubits of the resource states, as dictated by instructions from the controller 1322. In some examples, the controller 1322 is configured to receive instructions from the classical computing apparatus 1330 to perform encoded n-GHZ state measurements on selected groups of logical qubits of the received resource states during a particular clock cycle. In some examples, the instructions may indicate the logical qubits on which GHZ state measurements should be performed. The controller 1322 may generate control signals to route encoded qubits to appropriate measurement modules 1324 and may receive indications from the measurement modules 1324 indicating whether or not the encoded n-qubit GHZ state measurements were successful. The controller 1322 may use information from the measurement modules 1324 to produce error syndrome information and may provide error syndrome information to the classical computing apparatus 1330. The error syndrome information may comprise an error syndrome graph, the structure of which may be indicative of an error syndrome.

Classical computing apparatus 1330 is an example of a computer, in which computer usable program code or instructions implementing the processes may be located. In this example, classical computing apparatus 1330 includes communications fabric 1332, which provides communications between processor unit(s) 1334, memory unit(s) 1336, input/output unit 1338, communications module 1340, and display 1342. However, the skilled person would appreciate that other classical computing apparatuses would be suitable, such as a PC, one or more blade servers, a server farm, a high performance computing (HPC) system and so on.

The one or more classical processing units/processors 1334 are configured to execute instructions for software that may be loaded into the memory 1336. In particular, the processor is configured to adapt instructions for a quantum algorithm into commands to provide to the resource state system 1310 and the measurement system 1320. Processor unit(s) 1334 may be implemented using one or more heterogeneous processor systems in which a main processor is present with secondary processors on a single chip. If the processor units(s) 1334 include multiple units, the multiple units may work individually or collectively to execute one or more instructions.

The one or more memory unit(s) 1336 may comprise any piece of hardware that is capable of storing information such as, for example, data, program code in functional form, and/or other suitable information either on a temporary basis and/or a permanent basis. The one or more memory units 1336 may include, for example, a random-access memory or any other suitable volatile or non-volatile storage device (e.g., a non-transitory computer readable storage medium). The one or more memory units may include a form of persistent storage, for example a hard drive, a flash memory, a rewritable optical disk, a rewritable magnetic tape, or some combination thereof. The media used for persistent storage may also be removable. For example, the one or more memory units 1336 may include a removable hard drive.

Input/Output unit 1338 enables the input and output of data with other devices that may be in communication with the classical computing apparatus 1330. For example, input/output unit 1338 may provide a connection for user input through a keyboard, a mouse, and/or other suitable devices. For example, the classical computing apparatus may provide the functionality of the user device 1210 described above in relation to FIG. 12.

Communications module 1340 enables communications with other data processing systems or devices. The communications module 1340 may provide communications through the use of either or both physical and wireless communications links. The communications module 1340 is further configured to support communications between the processor unit 1334 of the classical computing apparatus 1330 and the controllers 1312 and 1322.

In some illustrative embodiments, instructions for performing a quantum algorithm may be downloaded over a network to the memory unit(s) 1336 from a remote device for use with the hybrid quantum computing system 1300. For instance, computer-implementable instructions stored in a remote server may be downloaded over a network 1220 from the server to the system 1300.

While the example of classical computing apparatus 1330 described above may indicate a software-driven implementation of components of the classical computing apparatus 1330 by a more general-purpose processor such as a CPU core based on program logic stored in a memory, in alternative embodiments, certain components of the classical computing apparatus 1330 may be partly embedded as pre-configured electronic systems or embedded controllers and circuits embodied as programmable logic devices, using, for example, application-specific integrated circuits (ASICs) or field-programmable gate arrays (FPGAs), which may be partly configured by embedded software or firmware.

In some examples, in use instructions for performing a quantum algorithm are received by the classical computing apparatus 1330 or retrieved from memory 1334, the instructions indicating a fault-tolerant measurement-based quantum computation to be performed using an implementation of an error correction code representable by a computational lattice (for example the RHG lattice) comprising a plurality of vertices and a plurality of edges. The classical computing apparatus 1330 may communicate with the resource state generation system 1310 to cause encoded two-qubit resource states to be generated for edges of the computational lattice in each clock cycle. The classical computing apparatus 1330 may communicate with the measurement system 1320 to perform, for vertices of the computational lattice, encoded n-GHZ measurements on corresponding n encoded qubits of a number n of two-qubit graph states, wherein n is at most the degree of the vertex. The measurement outcomes, or some function thereof, may be communicated back to the classical computing apparatus 1330. For example, the measurement system 1320 may generate error syndrome information and communicate the error syndrome information to the classical computing apparatus 1330. The classical computing apparatus may receive error syndrome information from the measurement system 1320 and decode error syndromes indicated by the error syndrome information. For example, the classical computing apparatus 1330) may construct or receive from the measurement system 1320 an error syndrome graph, the structure of which may be analysed by a decoder in the classical computing apparatus 1330) to determine errors in the computation. The classical computing apparatus 1330) may store records of errors and subsequently take corrective action in software (where appropriate) or by providing further instructions to the measurement system 1320 for performance in the next clock cycle. This may continue until the quantum algorithm is completed.

In some embodiments, the block diagram of FIG. 13 is part of a cloud computing system where quantum computing is provided as a shared service to separate users. In a first example, a cloud computing service provider operates the hybrid quantum computing system 1300 and allows users to use the system 1300. For example, a user using a computing apparatus, generates control instructions, and transmits the control instructions to the system 1300. Variations of the described embodiments are envisaged.

For example, one may further improve the chance of success of an encoded n-qubit GHZ state measurement by increasing the size of the repetition code used for each of the n encoded qubits 130. The use of additional E-BSMs may enable further redundancy to be built into the measurement protocol, increasing the chance of success at the cost of additional resources.

While in many of the examples above, a QPC encoding was disclosed, the skilled person would appreciate that any CSS-encoding would be suitable.

While in the examples of fault-tolerant quantum computation above the RHG lattice was described, the skilled person would appreciate that the methods and systems described herein are applicable to other error correction codes implementable by computational lattices, which may or may not be foliated error correction codes.

The word "module" has been used herein in relation to hardware functionality but is not intended to necessarily refer to distinct units: for example, the functionality of "two modules" may be combined into a single "module".

As used in this description and the claims, the singular forms "a", "an", and "the" include the plural forms unless the context clearly dictates otherwise.

All the features disclosed in this specification (including any accompanying claims, abstract and drawings), and/or all of the steps of any method or process so disclosed, may be combined in any combination, except combinations where at least some of the features and/or steps are mutually exclusive.

Each feature disclosed in this specification (including any accompanying claims, abstract or drawings), may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the spirit and scope of the claims.

What is claimed is:

1. An apparatus for performing a logical n-qubit Greenberger-Horne-Zeilinger (GHZ) measurement on n≥3 logical qubits, the apparatus comprising:
   an optical circuit comprising:
   an interferometer configured to:
   receive, as a plurality of input optical modes, the n logical qubits;
   interfere the n logical qubits; and
   output the interfered n logical qubits as output optical modes; and
   a detector arrangement comprising a plurality of photon detectors to measure a photon occupation of each of the output optical modes; and
   control logic coupled to the detector arrangement;
   wherein each logical qubit of the n logical qubits comprises a first Calderbank-Shor-Steane-encoded (CSS-encoded) qubit;
   wherein at least (n−2) of the n logical qubits further comprise a second CSS-encoded qubit, the first and second CSS-encoded qubits together comprising a repetition-encoded qubit;
   wherein each CSS-encoded qubit comprises a plurality of dual-rail encoded photonic qubits, each dual-rail encoded photonic qubit encoded as probability amplitudes corresponding to the photon occupation of two orthogonal optical modes;
   wherein interfering the n logical qubits comprises interfering a CSS-encoded qubit of the jth logical qubit with a CSS-encoded qubit of the (j+1)th logical qubit, for all j between 1 and n−1;
   wherein interfering a first CSS-encoded qubit with a second CSS-encoded qubit comprises interfering optical modes of each dual-rail encoded photonic qubit of the first CSS-encoded qubit with optical modes of a corresponding dual-rail encoded photonic qubit of the second CSS-encoded qubit; and
   wherein the control logic is configured to:
   receive an indication from the detector arrangement whether a dual-rail Bell state measurement (DR-BSM) has been performed on each interfered pair of dual-rail encoded photonic qubits; and
   determine, from the indication, that a logical n-qubit GHZ measurement has been performed on the n logical qubits.

2. The apparatus according to claim 1, wherein all n of the n logical qubits comprise a second CSS-encoded qubit, the first and second CSS-encoded qubits together comprising a repetition-encoded qubit.

3. The apparatus according to claim 2, wherein interfering the n logical qubits further comprises interfering a CSS-encoded qubit of the 1st logical qubit with a CSS-encoded qubit of the nth logical qubit.

4. The apparatus according to claim 1, wherein the input optical modes and output optical modes comprise spatial modes.

5. The apparatus according to claim 1, wherein the input optical modes and output optical modes comprise polarisation modes.

6. The apparatus according to claim 1, wherein at least a portion of the apparatus is implemented in a photonic integrated circuit.

7. The apparatus according to claim 1, wherein the detector arrangement comprises a plurality of threshold detectors or pseudo-threshold detectors.

8. The apparatus according to claim 1, wherein the control logic is implemented in a field programmable gate array (FPGA) or an application specific integrated circuit (ASIC).

9. The apparatus according to claim 1,
   wherein the interferometer comprises one or more active optical elements to selectively control interference between a first dual-rail encoded photonic qubit and a second dual-rail encoded photonic qubit; and
   wherein the control logic is coupled to the interferometer and is further configured to:
   generate one or more control signals to configure the one or more active optical elements to influence a type of dual-rail Bell state measurement (DR-BSM) that is performed on the interfered first and second dual-rail encoded photonic qubits.

10. The apparatus according to claim 9, wherein the control logic is configured to:
    generate the one or more control signals in response to receiving an indication from the detector arrangement that a type of dual-rail Bell state measurement (DR-BSM) has been performed on interfered third and fourth dual-rail encoded photonic qubits.

11. The apparatus according to claim 1, wherein each CSS-encoded qubit is a quantum parity code (QPC) encoded qubit.

12. A method for performing a logical n-qubit Greenberger-Horne-Zeilinger (GHZ) measurement on n logical qubits, the method comprising:
    receiving, as a plurality of input optical modes, the n logical qubits;
    interfering, in an interferometer, the n logical qubits and outputting the interfered n logical qubits as a plurality of output optical modes to a detector arrangement comprising a plurality of photon detectors;
    measuring, by the detector arrangement, a photon occupation of each of the output optical modes;

determining, from the measurement, that a logical n-qubit GHZ measurement has been performed on the n logical qubits;

wherein each logical qubit of the n logical qubits comprises a first Calderbank-Shor-Steane-encoded (CSS-encoded) qubit;

wherein at least (n−2) of the n logical qubits further comprise a second CSS-encoded qubit, the first and second CSS-encoded qubits together comprising a repetition-encoded qubit;

wherein each CSS-encoded qubit comprises a plurality of dual-rail encoded photonic qubits, each dual-rail encoded photonic qubit encoded as probability amplitudes corresponding to the photon occupation of two orthogonal optical modes;

wherein interfering the n logical qubits comprises interfering a CSS-encoded qubit of the jth logical qubit with a CSS-encoded qubit of the (j+1)th logical qubit, for all j between 1 and n−1;

wherein interfering a first CSS-encoded qubit with a second CSS-encoded qubit comprises interfering optical modes of each dual-rail encoded photonic qubit of the first CSS-encoded qubit with optical modes of a corresponding dual-rail encoded photonic qubit of the second CSS-encoded qubit; and wherein determining that the logical n-qubit GHZ measurement has been performed on the n logical qubits comprises:

receiving an indication from the detector arrangement whether a dual-rail Bell state measurement (DR-BSM) has been performed on each interfered pair of dual-rail encoded photonic qubits; and determining, from the indication, that an encoded n-qubit GHZ measurement has been performed on the n logical qubits.

13. A method for performing a logical n-qubit Greenberger-Horne-Zeilinger (GHZ) measurement on n logical qubits; wherein each logical qubit of the n logical qubits comprises a first Calderbank-Shor-Steane-encoded (CSS-encoded) qubit; wherein at least (n−2) of the n logical qubits further comprise a second CSS-encoded qubit, the first and second CSS-encoded qubits together comprising a repetition-encoded qubit; and wherein each CSS-encoded qubit comprises a plurality of dual-rail encoded photonic qubits (DR-qubit), each DR-qubit encoded as probability amplitudes corresponding to the photon occupation of two orthogonal optical modes;

the method comprising:

performing an encoded Bell state measurement (E-BSM) on a CSS-encoded qubit of the jth logical qubit and a CSS-encoded qubit of the (j+1)th logical qubit, for all j between 1 and n−1;

wherein performing an E-BSM on a first CSS-encoded qubit and a second CSS-encoded qubit comprises performing a plurality of dual-rail Bell state measurements (DR-BSMs), each DR-BSM performed on a respective DR-qubit of the first CSS-encoded qubit and a corresponding DR-qubit of the second CSS-encoded qubit.

14. The method according to claim 13, wherein all n of the n logical qubits comprise a second CSS-encoded qubit, the first and second CSS-encoded qubits together comprising a repetition-encoded qubit, the method further comprising:

performing an E-BSM on a CSS-encoded qubit of the $1^{st}$ logical qubit and a CSS-encoded qubit of the nth logical qubit.

15. An apparatus for performing a logical n-qubit Greenberger-Horne-Zeilinger (GHZ) measurement on n logical qubits, wherein each logical qubit of the n logical qubits comprises a first Calderbank-Shor-Steane-encoded (CSS-encoded qubit); wherein at least (n−2) of the n logical qubits further comprise a second CSS-encoded qubit, the first and second CSS-encoded qubits together comprising a repetition-encoded qubit; and wherein each CSS-encoded qubit comprises a plurality of dual-rail encoded photonic qubits (DR-qubit), each DR-qubit encoded as probability amplitudes corresponding to the photon occupation of two orthogonal optical modes;

the apparatus comprising:

a plurality of encoded Bell state measurement (E-BSM) modules, each E-BSM module configured to perform an E-BSM on respective first and second CSS-encoded qubits, each E-BSM module comprising:

a plurality of dual-rail Bell state measurement (DR-BSM) modules, each DR-BSM module configured to perform a DR-BSM on a respective DR-qubit of the first CSS-encoded qubit and a corresponding DR-qubit of the second CSS-encoded qubit;

the apparatus configured to:

perform an E-BSM on a CSS-encoded qubit of the jth logical qubit and a CSS-encoded qubit of the (j+1)th logical qubit, for all j between 1 and n−1.

16. The apparatus according to claim 15 further configured to:

perform an E-BSM on a CSS-encoded qubit of the 1st logical qubit and a CSS-encoded qubit of the nth logical qubit.

17. A method for fault-tolerant measurement-based quantum computation using an implementation of an error correction code representable by a computational lattice comprising a plurality of vertices and a plurality of edges, the method comprising:

generating, for edges of the lattice, logical two-qubit graph states, up to local Clifford operations; and processing information by performing, for vertices of the lattice, logical n-qubit Greenberger-Horne-Zeilinger (GHZ) measurements on n logical qubits of a number n two-qubit graph states, wherein n is the degree of the vertex;

wherein each logical qubit of a logical two-qubit graph state comprises at least one Calderbank-Shor-Steane-encoded (CSS-encoded qubit); and wherein each CSS-encoded qubit comprises a plurality of dual-rail encoded photonic qubits, each dual-rail encoded photonic qubit encoded as probability amplitudes corresponding to the photon occupation of two orthogonal optical modes.

18. The method according to claim 17, wherein performing a logical n-qubit GHZ measurement comprises:

receiving, as a plurality of input optical modes, the n logical qubits;

interfering, in an interferometer, the n logical qubits and outputting the interfered n logical qubits as a plurality of output optical modes to a detector arrangement comprising a plurality of photon detectors;

measuring, by the detector arrangement, a photon occupation of each of the output optical modes;

determining, from the measurement, that a logical n-qubit GHZ measurement has been performed on the n logical qubits;

wherein at least (n−2) of the n logical qubits further comprise a second CSS-encoded qubit, the first and second CSS-encoded qubits together comprising a repetition-encoded qubit;

wherein interfering the n logical qubits comprises interfering a CSS-encoded qubit of the jth logical qubit with a CSS-encoded qubit of the (j+1)th logical qubit, for all j between 1 and n−1;

wherein interfering a first CSS-encoded qubit with a second CSS-encoded qubit comprises interfering optical modes of each dual-rail encoded photonic qubit of the first CSS-encoded qubit with optical modes of a corresponding dual-rail encoded photonic qubit of the second CSS-encoded qubit; and wherein determining that the logical n-qubit GHZ measurement has been performed on the n logical qubits comprises:

receiving an indication from the detector arrangement whether a dual-rail Bell state measurement (DR-BSM) has been performed on each interfered pair of dual-rail encoded photonic qubits; and determining, from the indication, that a logical n-qubit GHZ measurement has been performed on the n logical qubits.

19. The method according to claim 17, wherein performed n-qubit GHZ measurements are of a first type (minimal n-GHZ measurements), the first type comprising:

performance of an encoded Bell state measurement (E-BSM) on a CSS-encoded qubit of the jth logical qubit and a CSS-encoded qubit of the (j+1)th logical qubit, for all j between 1 and n−1.

20. A method according to claim 17, wherein performed n-qubit GHZ measurements are of a second type (cyclic n-GHZ measurements), the second type comprising:

performance of an encoded Bell state measurement (E-BSM) on a CSS-encoded qubit of the jth logical qubit and a CSS-encoded qubit of the (j+1)th logical qubit, for all j between 1 and n−1; and performance of an E-BSM on a CSS-encoded qubit of the 1st logical qubit and a CSS-encoded qubit of the nth logical qubit.

21. The method according to claim 17, wherein each CSS-encoded qubit is a quantum parity code (QPC) encoded qubit.

22. The method according to claim 17, wherein the computational lattice comprises a Raussendorf-Harrington-Goyal lattice.

23. The method according to claim 17, wherein at least (n−2) of the n logical qubits further comprise a second CSS-encoded qubit, the first and second CSS-encoded qubits together comprising a repetition-encoded qubit;

wherein performing a logical n-qubit GHZ measurement comprises performing an encoded Bell state measurement (E-BSM) on a CSS-encoded qubit of the jth logical qubit and a CSS-encoded qubit of the (j+1)th logical qubit, for all j between 1 and n−1; and wherein performing an E-BSM on a first CSS-encoded qubit and a second CSS-encoded qubit comprises performing a plurality of dual-rail Bell state measurements (DR-BSMs), each DR-BSM performed on a respective DR-qubit of the first CSS-encoded qubit and a corresponding DR-qubit of the second CSS-encoded qubit.

24. A system for fault-tolerant measurement-based quantum computation, the system comprising:

a resource state generator comprising:
a plurality of single photon sources configured to generate photons; and
a linear optical circuit configured to receive the generated photons and probabilistically produce a plurality of logical two-qubit graph states, up to local Clifford operations; and a measurement apparatus configured to process information by performing logical n-qubit GHZ measurements on n logical qubits of a number n of the generated two-qubit graph states, the measurement apparatus comprising:
an optical circuit comprising:
an interferometer configured to:
receive, as a plurality of input optical modes, the n logical qubits;
interfere the n logical qubits; and
output the interfered n logical qubits as output optical modes; and
a detector arrangement comprising a plurality of photon detectors to measure a photon occupation of each of the output optical modes; and
control logic coupled to the detector arrangement;

wherein each logical qubit of the n logical qubits comprises a first Calderbank-Shor-Steane-encoded (CSS-encoded) qubit;

wherein at least (n−2) of the n logical qubits further comprise a second CSS-encoded qubit, the first and second CSS-encoded qubits together comprising a repetition-encoded qubit;

wherein each CSS-encoded qubit comprises a plurality of dual-rail encoded photonic qubits, each dual-rail encoded photonic qubit encoded as probability amplitudes corresponding to the photon occupation of two orthogonal optical modes;

wherein interfering the n logical qubits comprises interfering a CSS-encoded qubit of the jth logical qubit with a CSS-encoded qubit of the (j+1)th logical qubit, for all j between 1 and n−1;

wherein interfering a first CSS-encoded qubit with a second CSS-encoded qubit comprises interfering optical modes of each dual-rail encoded photonic qubit of the first CSS-encoded qubit with optical modes of a corresponding dual-rail encoded photonic qubit of the second CSS-encoded qubit; and wherein the control logic is configured to:
receive an indication from the detector arrangement whether a dual-rail Bell state measurement (DR-BSM) has been performed on each interfered pair of dual-rail encoded photonic qubits; and
determine, from the indication, that a logical n-qubit GHZ measurement has been performed on the n logical qubits.

25. The system according to claim 24, further comprising a classical computing device.

26. The system according to claim 24, further comprising a user device.

* * * * *